US012693391B2

(12) United States Patent
Yokogawa

(10) Patent No.: US 12,693,391 B2
(45) Date of Patent: Jul. 28, 2026

(54) RANGING SENSOR AND RANGING MODULE

(71) Applicant: SONY SEMICONDUCTOR SOLUTIONS CORPORATION, Kanagawa (JP)

(72) Inventor: Sozo Yokogawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 559 days.

(21) Appl. No.: 18/261,201

(22) PCT Filed: Dec. 16, 2021

(86) PCT No.: PCT/JP2021/046512
§ 371 (c)(1),
(2) Date: Jul. 12, 2023

(87) PCT Pub. No.: WO2022/158186
PCT Pub. Date: Jul. 28, 2022

(65) Prior Publication Data
US 2024/0085535 A1     Mar. 14, 2024

(30) Foreign Application Priority Data

Jan. 20, 2021     (JP) ................................. 2021-007239

(51) Int. Cl.
*G01C 3/08* (2006.01)
*G01S 7/484* (2006.01)
(Continued)

(52) U.S. Cl.
CPC ............ *G01S 7/4863* (2013.01); *G01S 7/484* (2013.01); *G01S 17/894* (2020.01)

(58) Field of Classification Search
CPC ....... G01S 7/4863; G01S 7/484; G01S 17/894
See application file for complete search history.

(56) References Cited

U.S. PATENT DOCUMENTS 10,291,867 B2 *   5/2019   Hirota .................... H04N 25/57
2020/0393549 A1 *  12/2020   Jin ...................... H10F 30/2863

FOREIGN PATENT DOCUMENTS

JP        2019-004149 A      1/2019
JP        2019-103030 A      6/2019
(Continued)

OTHER PUBLICATIONS

International Search Report and Written Opinion of PCT Application No. PCT/JP2021/046512, issued on Mar. 1, 2022, 08 pages of ISRWO.

*Primary Examiner* — Mark Hellner
(74) *Attorney, Agent, or Firm* — CHIP LAW GROUP

(57)     ABSTRACT

A ranging sensor includes a pixel including a photoelectric conversion element, a first storage node and a second storage node that store charge transferred from the photoelectric conversion element, a first transfer gate and a second transfer gate connected to the photoelectric conversion element so as to branch and transfer the charge generated in the photoelectric conversion element to different paths, a third transfer gate connected between the first storage node and the first transfer gate, a fourth transfer gate connected between the second storage node and the second transfer gate, a fifth transfer gate connected between the first storage node and the second transfer gate, and a sixth transfer gate connected between the second storage node and the first transfer gate, the ranging sensor including a transfer gate drive unit that drives each of the first to sixth transfer gates.

14 Claims, 13 Drawing Sheets

(51) Int. Cl.
   *G01S 7/4863*      (2020.01)
   *G01S 17/894*     (2020.01)

(56)             References Cited

FOREIGN PATENT DOCUMENTS

| | | | | |
|---|---|---|---|---|
| KR | 20180108561 A | * | 10/2018 | .......... H04N 23/667 |
| WO | 2019/054099 A1 | | 3/2019 | |
| WO | 2020/241151 A1 | | 12/2020 | |

\* cited by examiner

| SN1 | 0deg | RO | 90deg | RO | DT | |
|---|---|---|---|---|---|---|
| | | | | | | |
| SN2 | 180deg | RO | 270deg | RO | DT | |

T1          T2

| SN11 | 0deg | RO | DT | |
|------|------|----|----|--|
| | | | | |
| SN21 | 180deg | RO | DT | |
| | | | | |
| SN12 | 90deg | RO | DT | |
| | | | | |
| SN22 | 270deg | RO | DT | |

T1

RANGING SENSOR AND RANGING MODULE

CROSS REFERENCE TO RELATED APPLICATIONS

This application is a U.S. National Phase of International Patent Application No. PCT/JP2021/046512 filed on Dec. 16, 2021, which claims priority benefit of Japanese Patent Application No. JP 2021-007239 filed in the Japan Patent Office on Jan. 20, 2021. Each of the above-referenced applications is hereby incorporated herein by reference in its entirety.

TECHNICAL FIELD

The present technology relates to a technical field of a ranging sensor and a ranging module including a circuit that distributes, for every minute time, charge generated by receiving reflected light of intensity-modulated irradiation light.

BACKGROUND ART

For example, a ranging sensor compatible with an indirect time of flight (iToF) method which is a type of time-of-flight ranging method generates distance information by alternately transferring charge generated in a photoelectric conversion element to a plurality of floating diffusion regions (FD) every minute time.

For example, in Patent Document 1 described below, two FDs are disposed for one photoelectric conversion region, the charge is transferred to the two FDs every minute time, and thus the charge necessary for generating the distance information is accumulated.

CITATION LIST

Patent Document

Patent Document 1: Japanese Patent Application Laid-Open No. 2019-004149

SUMMARY OF THE INVENTION

Problems to be Solved by the Invention

As a matter of fact, each circuit included in the ranging sensor has variation in characteristics due to individual differences and the like. The variation in characteristics in the circuit greatly affects a ranging result in some cases. For example, in the technology disclosed in Patent Document 1, a reading circuit that reads the charge from the FD is different for every FD, and therefore, there is a possibility that the variation in the characteristics of the reading circuit affects the ranging result.

The present technology has been made in view of the above circumstances, and an object of the present technology is to improve accuracy of a ranging result by eliminating variations in characteristics in a circuit.

Solutions to Problems

A ranging sensor of the present technology includes a pixel including a photoelectric conversion element, a first storage node and a second storage node that store charge transferred from the photoelectric conversion element, a first transfer gate and a second transfer gate connected to the photoelectric conversion element so as to branch and transfer the charge generated in the photoelectric conversion element to different paths, a third transfer gate connected between the first storage node and the first transfer gate, a fourth transfer gate connected between the second storage node and the second transfer gate, a fifth transfer gate connected between the first storage node and the second transfer gate, and a sixth transfer gate connected between the second storage node and the first transfer gate, the ranging sensor including a transfer gate drive unit that drives each of the first to sixth transfer gates.

As a result, at least two paths for accumulating the charge are provided in the first storage node. In a similar manner, at least two paths for accumulating the charge are provided in the second storage node.

In the ranging sensor described above, the pixel may include a floating diffusion region, a seventh transfer gate connected between the first storage node and the floating diffusion region, and an eighth transfer gate connected between the second storage node and the floating diffusion region.

As a result, the floating diffusion region used for reading from the first storage node and the second storage node and a reading circuit from the floating diffusion region are common.

In the ranging sensor described above, the pixel may include an overflow gate that discharges the charge generated in the photoelectric conversion element.

As a result, overflow of the charge generated in the photoelectric conversion element is suppressed.

In the ranging sensor described above, the photoelectric conversion element may receive reflected light of light emitted by a light emitter that performs pulse light emission, and the transfer gate drive unit may perform ON/OFF control of the first transfer gate and the second transfer gate by a pulse signal that drives the light emitter.

That is, the first transfer gate and the second transfer gate are alternately controlled to be turned on.

In the ranging sensor described above, the transfer gate drive unit may control each of the first to sixth transfer gates such that the charge is accumulated in the second storage node via the second transfer gate while the charge is accumulated in the first storage node via the first transfer gate, and may control each of the first to sixth transfer gates such that the charge is accumulated in the first storage node via the second transfer gate while the charge is accumulated in the second storage node via the first transfer gate.

As a result, the charge transferred by the first transfer gate and the charge transferred by the second transfer gate are divided and accumulated in the first storage node and the second storage node.

In the ranging sensor described above, the transfer gate drive unit may control the fifth transfer gate to be turned off while controlling the third transfer gate to be turned on, and may control the sixth transfer gate to be turned off while controlling the fourth transfer gate to be turned on.

As a result, the charge transferred via the first transfer gate is prevented from being simultaneously transferred to both the first storage node and the second storage node. In a similar manner, the charge transferred via the second transfer gate is prevented from being simultaneously transferred to both the first storage node and the second storage node.

In the ranging sensor described above, the transfer gate drive unit may control the third transfer gate and the fourth transfer gate to be turned on during a first period and may control the fifth transfer gate and the sixth transfer gate to be turned on during a second period different from the first period, and a length of the first period may be equal to a length of the second period.

As a result, the length of the period during which the charge is accumulated in the first storage node via the third gate is equal to the length of the period during which the charge is accumulated in the first storage node via the sixth gate. In a similar manner, the length of the period during which the charge is accumulated in the second storage node via the fourth gate is equal to the length of the period during which the charge is accumulated in the second storage node via the fifth gate.

In the ranging sensor described above, a length of a period during which the charge is accumulated via the first transfer gate and a length of a period during which the charge is accumulated via the second transfer gate in the first storage node may be both equal to a length of a period during which the charge is accumulated via the first transfer gate and a length of a period during which the charge is accumulated via the second transfer gate in the second storage node.

As a result, the length of the period during which the charge is transferred to the first storage node via the first transfer gate and accumulated and the length of the period during which the charge is transferred to the first storage node via the second transfer gate and accumulated are the same. The length of the period during which the charge is transferred to the second storage node via the first transfer gate and accumulated and the length of the period during which the charge is transferred to the second storage node via the second transfer gate and accumulated are the same.

In the ranging sensor described above, the transfer gate drive unit may drive each of the third transfer gate, the fourth transfer gate, the fifth transfer gate, and the sixth transfer gate by three levels.

As a result, for example, it is possible to perform driving with negative bias in addition to ON/OFF driving.

In the ranging sensor described above, the driving by three levels may include driving with negative bias.

By driving with negative bias, it is possible to suppress accumulation of an unintended charge in the first storage node and the second storage node.

In the ranging sensor described above, the transfer gate drive unit may drive, with negative bias, the third transfer gate, the fourth transfer gate, the fifth transfer gate, and the sixth transfer gate during a read period of the charge accumulated in the first storage node and the second storage node.

As a result, it is possible to suppress accumulation of an unintended charge in the first storage node and the second storage node during the read period.

The ranging sensor described above may include a plurality of the pixels.

As a result, a distance image including a plurality of pieces of distance information for every pixel is generated.

The ranging sensor described above may include a pixel array unit in which the pixels are two-dimensionally arrayed.

As a result, the distance image as two-dimensional data is generated.

A ranging module of the present technology includes a light emitter that performs pulse light emission, and a ranging sensor including a pixel including a photoelectric conversion element that receives reflected light of light emitted from the light emitter, the ranging sensor including a transfer gate drive unit that drives a plurality of transfer gates, in which the pixel includes the photoelectric conversion element, a first storage node and a second storage node that store charge transferred from the photoelectric conversion element, a first transfer gate and a second transfer gate connected to the photoelectric conversion element so as to branch and transfer the charge generated in the photoelectric conversion element to different paths, a third transfer gate connected between the first storage node and the first transfer gate, a fourth transfer gate connected between the second storage node and the second transfer gate, a fifth transfer gate connected between the first storage node and the second transfer gate, and a sixth transfer gate connected between the second storage node and the first transfer gate.

With such a ranging module, the above-described various functions can be obtained.

BRIEF DESCRIPTION OF DRAWINGS

FIG. 1 is a block diagram illustrating a configuration example of ranging module according to the present technology.

FIG. 7 is an explanatory diagram illustrating a relationship between an accumulation period, a read period, and a dead time.

MODE FOR CARRYING OUT THE INVENTION

Figure 2:
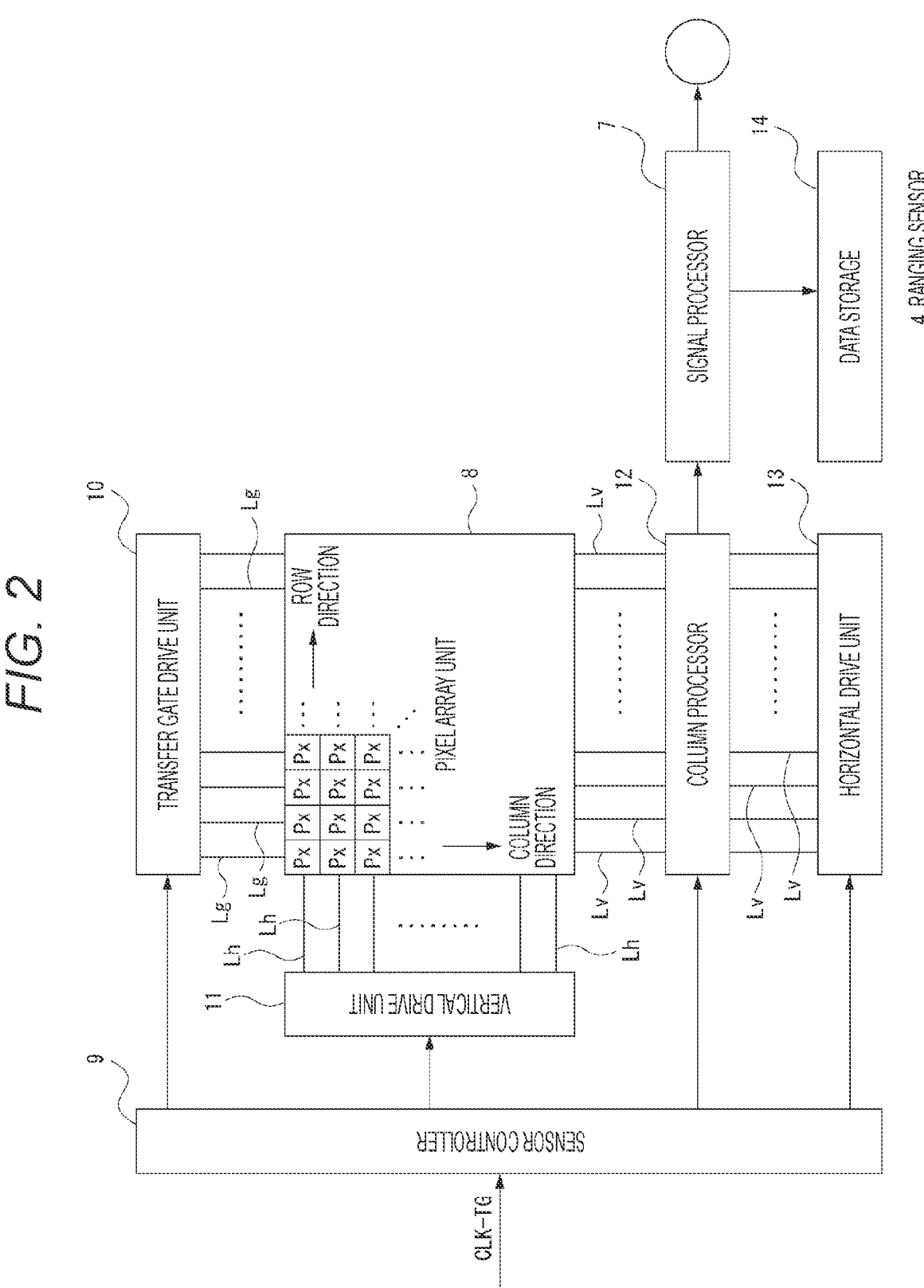
FIG. 2 is a block diagram illustrating a configuration example of a ranging sensor.

Hereinafter, embodiments according to the present technology will be described in the following order with reference to the accompanying drawings.

<1. Configuration example of ranging module>
<2. Circuit configuration of pixel>
<3. Operation of pixel>
<4. Arrangement example of circuit element>
<5. Second Embodiment>
<6. Modification>
<7. Summary>
<8. Present technology>

1. Configuration Example of Ranging Module

Figure 1:
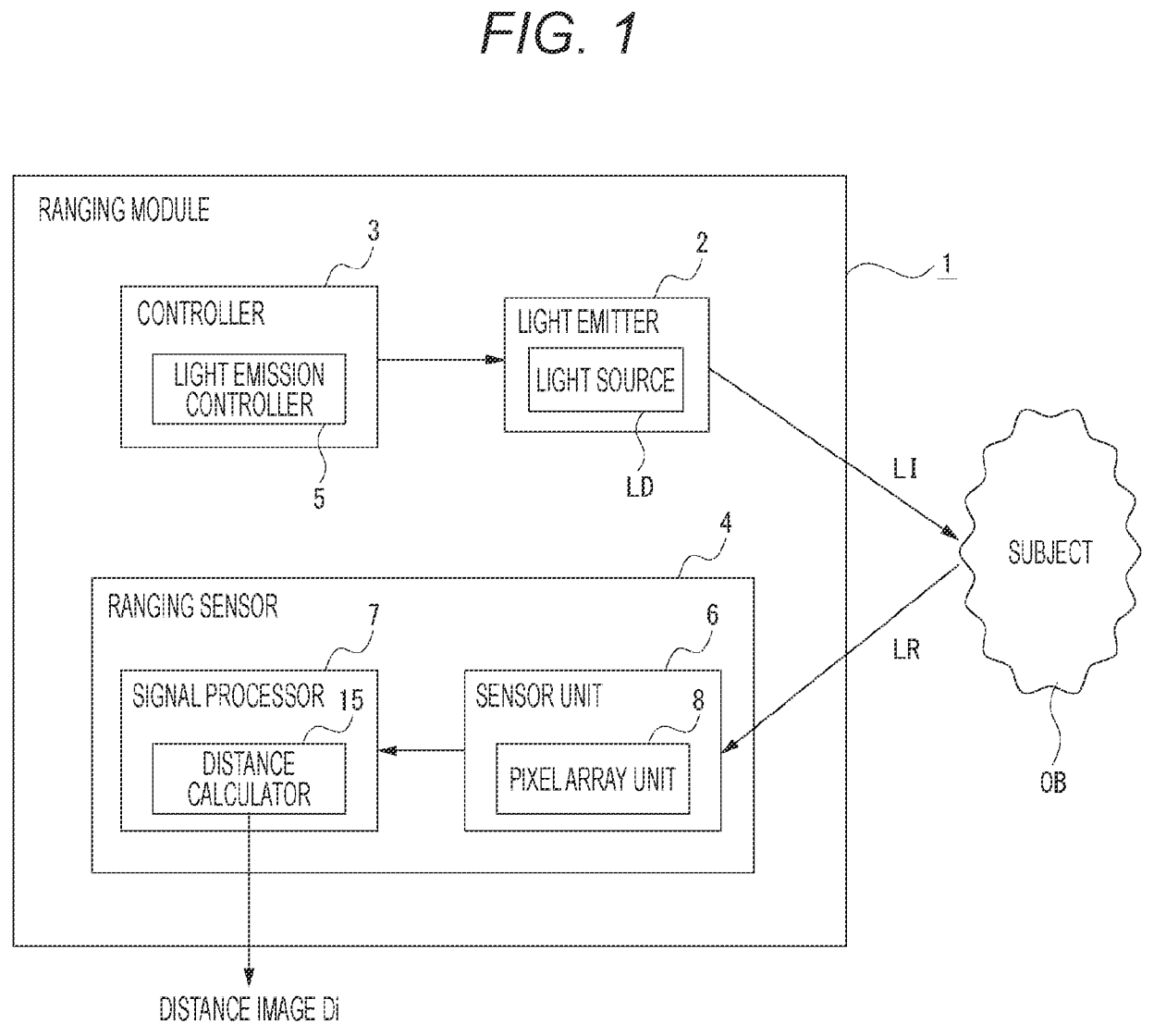

FIG. 1 illustrates a configuration example of a ranging module 1.

The ranging module 1 includes a ranging sensor as an embodiment of the present technology.

The ranging module 1 is a module that performs ranging by an indirect time of flight (iToF) method, and includes a light emitter 2, a controller 3, and a ranging sensor 4. The iToF method calculates a distance between the ranging module and a subject OB by detecting a difference between a phase of an intensity-modulated irradiation light LI emitted to the subject OB and a phase of a reflected light LR obtained by reflecting the irradiation light LI by the subject OB.

The light emitter 2 includes one or more light emitting elements as a light source LD. The light emitter 2 irradiates the subject OB with the irradiation light LI. The irradiation light LI is, for example, infrared light (IR light) in a range of 780 nm to 1000 nm.

The controller 3 includes a light emission controller 5 for driving the light source LD of the light emitter 2. The light emission controller 5 generates a clock signal for emitting intensity-modulated light whose intensity changes at a predetermined cycle, and supplies the clock signal to the light emitter 2. The frequency of the clock signal is, for example, several MHz to several hundreds of MHz.

The light emitter 2 generates an irradiation signal Sp as a pulse signal on the basis of the clock signal supplied from the controller 3 and supplies the irradiation signal Sp to the light source LD to drive the light source LD to emit light. Note that the light emitter 2 may drive the light source LD to emit light by using the clock signal itself supplied from the controller 3.

In the following description, a cycle of the light emission of the light source LD is referred to as a "light emission cycle Cm". The light emission cycle Cm is represented by an inverse number of the frequency of the clock signal.

The ranging sensor 4 includes a sensor unit 6 and a signal processor 7. The sensor unit 6 is, for example, a backside illuminated sensor chip in which an optical member such as an on-chip microlens is formed on a back surface of a semiconductor substrate on which a photoelectric conversion element is formed, and a wiring layer is formed on a front surface of the semiconductor substrate.

The signal processor 7 may be formed as a semiconductor chip other than the sensor unit 6, or may be a semiconductor chip integrated with the sensor unit 6.

The sensor unit 6 includes a pixel array unit 8. Specific configuration examples of the sensor unit 6 and the pixel array unit 8 will be described with reference to FIG. 2.

The ranging sensor 4 includes the pixel array unit 8, a sensor controller 9, a transfer gate drive unit 10, a vertical drive unit 11, a column processor 12, a horizontal drive unit 13, the signal processor 7, and a data storage 14.

The pixel array unit 8 has a configuration in which pixels Px are two-dimensionally arrayed in a row direction and a column direction, and further has a circuit configuration including a signal line or the like for driving the pixels Px. These circuit configurations will be described later again.

Note that, in the following description, the row direction refers to an arrangement direction of the pixels Px arrayed in the horizontal direction, and the column direction refers to an arrangement direction of the pixels Px arrayed in the vertical direction. In FIG. 2, the row direction is a lateral direction, and the column direction is a longitudinal direction.

The pixel array unit 8 outputs distance information measured for every pixel Px. As known, in the pixel Px in the iToF method, for example, charge generated in a photoelectric conversion element by light reception is distributed to an accumulator (or a holder) by two transfer gates alternately controlled to be turned on. As will be described in detail later, the pixel Px in the present embodiment includes a storage node different from a floating diffusion region (FD) as an accumulator to which the charge is distributed.

Here, a switching cycle of the two transfer gates is the same as the cycle (=light emission cycle Cm) of the irradiation signal Sp supplied to the light source LD. That is, in one cycle of the irradiation signal Sp, switching of an ON state from one transfer gate to the other transfer gate and switching of the ON state from the other transfer gate to the one transfer gate are performed once.

Since the frequency of the irradiation signal Sp is relatively high as described above, the charge accumulated in the accumulator is significantly small in amount in a case where the above-described switching of the transfer gates is performed once for each. Therefore, in order to improve the accuracy of the distance information, in the iToF method, the intensity modulation of the irradiation light LI is repeated about several thousands of times to several tens of thousands of times, and ON control and OFF control are repeated the same number of times in the transfer gate of the pixel Px.

In this manner, the amount of charge accumulated in the accumulator is increased to enhance the accuracy of the distance information.

The sensor controller 9 includes a timing generator or the like that generates various timing signals on the basis of an input predetermined clock signal, and drives the transfer gate drive unit 10, the vertical drive unit 11, the column processor 12, and the horizontal drive unit 13 on the basis of the generated timing signals.

The transfer gate drive unit 10 performs ON/OFF control of the transfer gate in synchronization with the cycle of the irradiation signal Sp. In the present embodiment, as will be described later, two transfer gates among a plurality of transfer gates provided for one pixel Px are driven by using a timing signal synchronized with the irradiation signal Sp. In addition, the ON/OFF control is also performed on the other transfer gates provided in the pixel Px by using a timing signal having a frequency lower than the frequency of the irradiation signal Sp. The driving of each transfer gate will be described later again with reference to a timing chart.

The transfer gate drive unit 10 drives each transfer gate via a gate drive line Lg corresponding to a pixel column.

Figure 3:
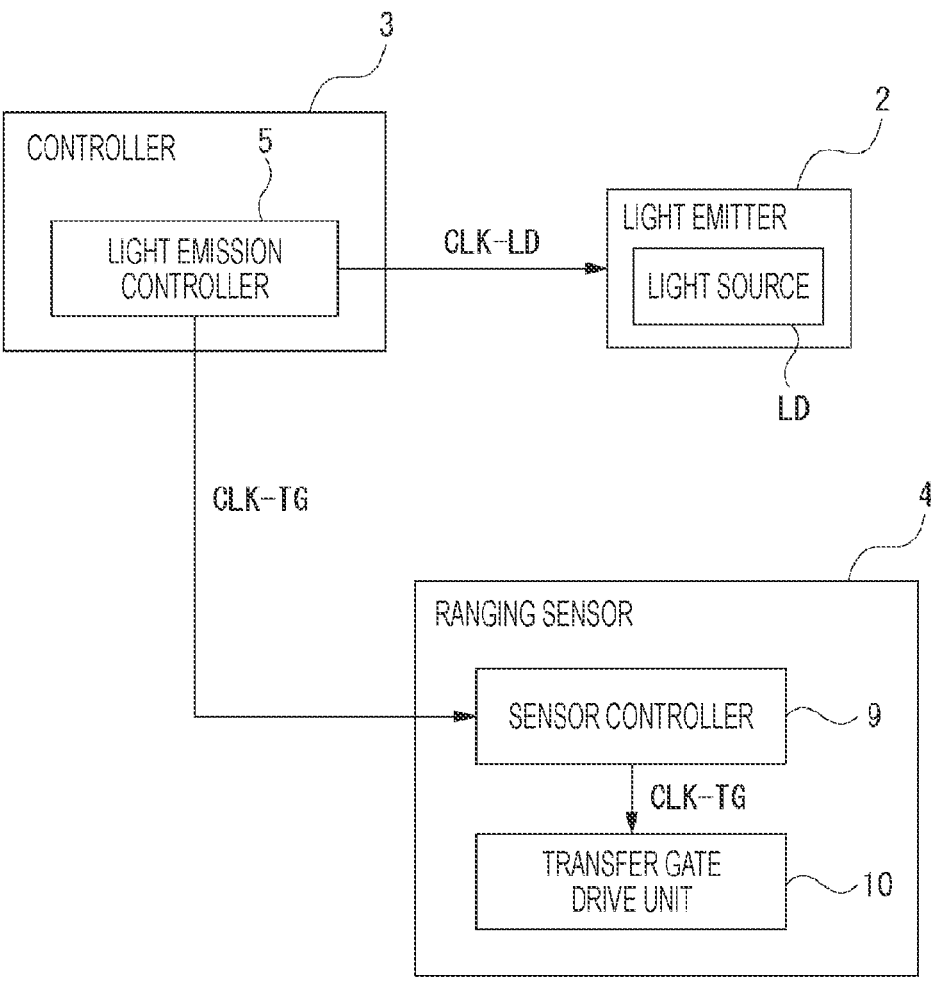
FIG. 3 is an explanatory diagram of a clock signal.

Here, a predetermined clock signal supplied to the sensor controller 9 will be described with reference to FIG. 3.

The light emission controller 5 of the controller 3 generates a clock signal CLK-LD to be supplied to the light source LD included in the light emitter 2. Specifically, the light emission controller 5 generates the clock signal CLK-LD generated by using an oscillator. The light emission controller 5 supplies the generated clock signal CLK-LD to the light emitter 2.

In addition, the sensor controller 9 supplies the clock signal CKL-TG to the transfer gate drive unit 10 in order for the transfer gate drive unit 10 to drive the transfer gate in synchronization with the irradiation signal Sp generated on the basis of the clock signal CLK-LD.

A clock signal CLK-TG is the same signal as the clock signal CLK-LD supplied to the light emitter 2. Therefore, the light emission controller 5 supplies the clock signal CLK-LD as the clock signal CLK-TG to the sensor controller 9 of the ranging sensor 4.

FIG. 2 will be described again.

The vertical drive unit 11 includes a shift register, an address decoder, and the like, and drives the pixels Px of the pixel array unit 8 via a row drive line Lh at the same time for all the pixels, in units of rows, or the like. That is, the vertical drive unit 11 constitutes a drive unit that controls operation of each pixel Px of the pixel array unit 8 together with the sensor controller 9 that controls the vertical drive unit 11.

A detection signal output (read) from each pixel Px of the pixel row in accordance with drive control by the vertical drive unit 11, specifically, a signal corresponding to the charge accumulated in the floating diffusion region provided in every pixel Px is input to the column processor 12 through a corresponding vertical signal line Lv.

The column processor 12 performs predetermined signal processing on the detection signal read from each pixel Px through the vertical signal line Lv, and temporarily holds the detection signal after the signal processing. Specifically, the column processor 12 performs noise removal processing, analog to digital (A/D) conversion processing, or the like as signal processing.

The detection signal is read from one floating diffusion region provided in each pixel Px a number of times corresponding to the number of accumulators in which the charge distributed in synchronization with the intensity modulation of the irradiation light LI is accumulated. In the present embodiment, since the number of accumulators is two as described later, the accumulated charge is transferred to the floating diffusion region for every accumulator for each pixel Px and read as a detection signal. That is, since one time of reading is executed for each of the two accumulators, a total of two times of reading is performed in the floating diffusion region in the pixel Px. The accumulators will be described later again.

Note that reading of the detection signal from each pixel Px is performed for every accumulator after the ON/OFF control of the transfer gate is performed from several thousands of times to several tens of thousands of times as described above. That is, the charge accumulated in small amounts from several thousands of times to several tens of thousands of times is read as a detection signal by one time of reading.

The sensor controller 9 controls the vertical drive unit 11 on the basis of the clock signal CLK-TG so that a reading timing of the detection signal from each pixel Px becomes a timing every time the light source LD repeatedly emits light a predetermined number of times as described above.

The horizontal drive unit 13 includes a shift register, an address decoder, and the like, and sequentially selects a unit circuit corresponding to each column of pixels in the column processor 12. Selective scanning by the horizontal drive unit 13 sequentially outputs detection signals subjected, in the column processor 12, to the signal processing for every unit circuit.

The signal processor 7 has at least an arithmetic processing function, and performs various types of signal processing such as calculation processing of a distance corresponding to the iToF method on the basis of the detection signals output from the column processor 12.

Therefore, as illustrated in FIG. 1, the signal processor 7 includes a distance calculator 15.

Note that a known method can be used as a method of calculating the distance information by the iToF method on the basis of the two types of detection signals output from the pixel Px, that is, the detection signal for every accumulator, and thus the description thereof will be omitted here.

The data storage 14 temporarily stores data necessary for signal processing in achieving the signal processing in the signal processor 7.

The ranging sensor 4 configured as described above outputs a distance image Di in which the distance information indicating the distance to the imaged subject OB is associated with every pixel Px. The ranging module 1 including such a ranging sensor 4 can be applied to, for example, an in-vehicle system that is mounted on a vehicle and measures the distance to the subject OB outside the vehicle, a gesture recognizer that measures a distance to an object such as a hand of a user and recognizes a gesture of the user on the basis of a measurement result, and the like.

2. Circuit Configuration of Pixel

Figure 4:
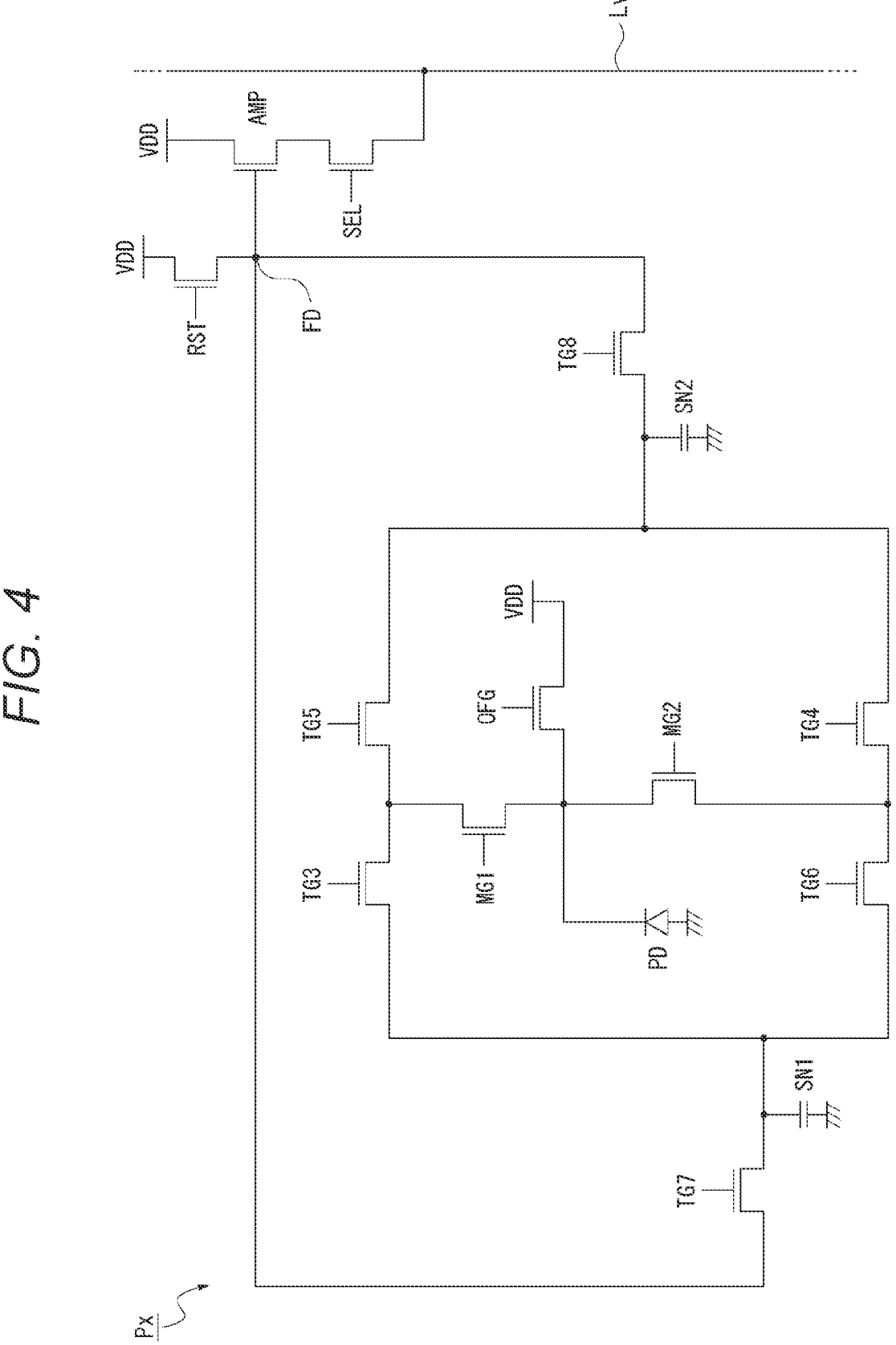
FIG. 4 is a circuit diagram illustrating an example of a circuit configuration provided in a pixel.

FIG. 4 illustrates a circuit configuration of the pixel Px included in the pixel array unit 8.

Note that, as a ranging mode of the ranging module 1, there are various possible methods such as a method of performing ranging by using two signals having phase shift amounts of 0 deg and 180 deg for a modulation frequency of the irradiation signal Sp, a method of performing ranging by using four signals having phase shift amounts of 0 deg, 90 deg, 180 deg, and 270 deg, and a method of performing ranging by using five or more signals having different phase shift amounts.

In the following description, a method of performing ranging by using four signals having phase shift amounts of 0 deg, 90 deg, 180 deg, and 270 deg will be described as an example.

The pixel Px includes one photodiode PD and one overflow gate OFG as photoelectric conversion elements. Furthermore, the pixel Px includes a first transfer gate MG1 and a second transfer gate MG2 that are configured as transfer gate elements by a transistor or the like and are subjected to the ON/OFF control at a high speed in synchronization with the irradiation signal Sp supplied to the light source LD described above. Then, the pixel Px includes a first storage node SN1 and a second storage node SN2 in which the charge transferred by the first transfer gate MG1 and the second transfer gate MG2 is accumulated and held.

The transistor as a transfer gate element is, for example, a metal-oxide-semiconductor field-effect transistor (MOS-FET).

The first storage node SN1 and the second storage node SN2 are, for example, metal-oxide-semiconductor (MOS) capacitors.

In addition, the pixel Px includes a third transfer gate TG3 and a fifth transfer gate TG5 as two transfer gates for distributing the charge transferred by the first transfer gate MG1 to the first storage node SN1 and the second storage node SN2.

The third transfer gate TG3 is disposed between the first transfer gate MG1 and the first storage node SN1. Thus, the first transfer gate MG1 and the third transfer gate TG3 are cascade-connected between the photodiode PD and the first storage node SN1.

Therefore, the charge generated by the photodiode PD is transferred to the first storage node SN1 in a case where both the first transfer gate MG1 and the third transfer gate TG3 are controlled to be turned on.

The fifth transfer gate TG5 is disposed between the first transfer gate MG1 and the second storage node SN2. Thus, the first transfer gate MG1 and the fifth transfer gate TG5 are cascade-connected between the photodiode PD and the second storage node SN2.

Therefore, the charge generated by the photodiode PD is transferred to the second storage node SN2 in a case where both the first transfer gate MG1 and the fifth transfer gate TG5 are controlled to be turned on.

Furthermore, the pixel Px includes a fourth transfer gate TG4 and a sixth transfer gate TG6 as two transfer gates for distributing the charge transferred by the second transfer gate MG2 to the first storage node SN1 and the second storage node SN2.

The fourth transfer gate TG4 is disposed between the second transfer gate MG2 and the second storage node SN2. Thus, the second transfer gate MG2 and the fourth transfer gate TG4 are cascade-connected between the photodiode PD and the second storage node SN2.

Therefore, the charge generated by the photodiode PD is transferred to the second storage node SN2 in a case where both the second transfer gate MG2 and the fourth transfer gate TG4 are controlled to be turned on.

The sixth transfer gate TG6 is disposed between the second transfer gate MG2 and the first storage node SN1. Thus, the second transfer gate MG2 and the sixth transfer gate TG6 are cascade-connected between the photodiode PD and the first storage node SN1.

Therefore, the charge generated by the photodiode PD is transferred to the first storage node SN1 in a case where both the second transfer gate MG2 and the sixth transfer gate TG6 are controlled to be turned on.

That is, in the pixel Px, the charge having passed through the first transfer gate MG1 can be accumulated in the first storage node SN1, and can be also accumulated in the second storage node SN2.

In a similar manner, in the pixel Px, the charge having passed through the second transfer gate MG2 can be accumulated in the first storage node SN1, and can be also accumulated in the second storage node SN2.

A connection example of the photodiode PD, the first storage node SN1, the second storage node SN2, the first transfer gate MG1, the second transfer gate MG2, the third transfer gate TG3, the fourth transfer gate TG4, the fifth transfer gate TG5, and the sixth transfer gate TG6 will be described specifically.

A drain of the first transfer gate MG1 and a drain of the second transfer gate MG2 are both connected to a cathode of the photodiode PD.

A source of the first transfer gate MG1 is connected to a drain of the third transfer gate TG3. A source of the third transfer gate TG3 is connected to the first storage node SN1.

A drain of the fifth transfer gate TG5 is connected to a connection point between the first transfer gate MG1 and the third transfer gate TG3.

A source of the fifth transfer gate TG5 is connected to the second storage node SN2.

A source of the second transfer gate MG2 is connected to a drain of the fourth transfer gate TG4. A source of the fourth transfer gate TG4 is connected to the second storage node SN2.

A drain of the sixth transfer gate TG6 is connected to a connection point between the second transfer gate MG2 and the fourth transfer gate TG4.

A source of the sixth transfer gate TG6 is connected to the first storage node SN1.

In addition, the pixel Px includes a floating diffusion region FD that holds the charge transferred from either the first storage node SN1 or the second storage node SN2 until the timing of reading, a seventh transfer gate TG7 that transfers the charge accumulated in the first storage node SN1 to the floating diffusion region FD, and an eighth transfer gate TG8 that transfers the charge accumulated in the second storage node SN2 to the floating diffusion region FD.

The pixel Px includes one reset transistor RST, one amplification transistor AMP, and one selection transistor SEL.

Each of the transfer gates MG and TG, the overflow gate OFG, the reset transistor RST, the amplification transistor AMP, and the selection transistor SEL includes, for example, an N-type MOS transistor.

The overflow gate OFG enters a conductive state when an overflow gate signal Sofg supplied to the gate is turned on. When the overflow gate OFG enters the conductive state, the photodiode PD is clamped at a predetermined reference potential VDD, and the accumulated charge is reset.

Note that the overflow gate signal Sofg is supplied from the vertical drive unit 11, for example.

The charge generated by the photodiode PD is first transferred to the first storage node SN1 and the second storage node SN2.

Here, a control state of each of the transfer gates MG and TG when the charge generated in the photodiode PD is accumulated in the first storage node SN1 and the second storage node SN2 will be described.

The first transfer gate MG1 and the second transfer gate MG2 are controlled in synchronization with the irradiation signal Sp supplied to the light source LD, and the first transfer gate MG1 and the second transfer gate MG2 are controlled so as not to be turned on at the same time. That is, the first transfer gate MG1 and the second transfer gate MG2 are alternately controlled to be turned on at a high speed.

Here, the ranging module 1 detects a plurality of signals having different phase shift amounts for the modulation frequency of the irradiation signal Sp for ranging. In order to detect one signal, it is necessary to accumulate the charge generated by receiving the reflected light LR over a time during which the intensity modulation of the irradiation light LI is repeated about several thousands of times to several tens of thousands of times. A light receiving time for detecting one signal is referred to as a time T1 (see FIG. 5).

Assuming that the number of times of turning on and off the irradiation light LI repeated during the time T1 is n, the time T1 is a time obtained by multiplying the light emission cycle Cm by the number n.

Note that, although described later, in the circuit configuration illustrated in FIG. 4, two or four types of detection signals (for example, a detection signal having a phase difference of 0 deg and a detection signal having a phase difference of 180 deg) can be obtained during one time T1.

In addition, the time T1 is divided into halves which are the first half and the second half, time in the first half is referred to as a time Ta, and time in the second half is referred to as Tb. The time Ta and the time Tb are times obtained by multiplying the time T1 by 0.5.

At this time, the transfer gate drive unit 10 controls the third transfer gate TG3 and the fourth transfer gate TG4 to be turned on and controls the fifth transfer gate TG5 and the sixth transfer gate TG6 to be turned off during the time Ta.

Accordingly, during the time Ta, the charge generated by the photodiode PD is intermittently transferred to the first storage node SN1 on the basis of the ON/OFF control of the first transfer gate MG1, and is intermittently transferred to the second storage node SN2 on the basis of the ON/OFF control of the second transfer gate MG2.

In addition, the transfer gate drive unit 10 controls the third transfer gate TG3 and the fourth transfer gate TG4 to be turned off and controls the fifth transfer gate TG5 and the sixth transfer gate TG6 to be turned on during the time Tb.

Accordingly, during the time Tb, the charge generated by the photodiode PD is intermittently transferred to the second storage node SN2 on the basis of the ON/OFF control of the first transfer gate MG1, and is intermittently transferred to the first storage node SN1 on the basis of the ON/OFF control of the second transfer gate MG2.

That is, both the charge having passed through the first transfer gate MG1 and the charge having passed through the second transfer gate MG2 are accumulated in the first storage node SN1. Then, the time (=Ta) during which the charge having passed through the first transfer gate MG1 is accumulated and the time (=Tb) during which the charge having passed through the second transfer gate MG2 is accumulated have the same length.

In a similar manner, both the charge having passed through the first transfer gate MG1 and the charge having passed through the second transfer gate MG2 are accumulated in the second storage node SN2. Then, the time (=Ta) during which the charge having passed through the first transfer gate MG1 is accumulated and the time (=Tb) during which the charge having passed through the second transfer gate MG2 is accumulated have the same length.

The charge accumulated in the first storage node SN1 is transferred to the floating diffusion region FD on the basis of the control of the seventh transfer gate TG7. Specifically, when a transfer drive signal Stg7 supplied to the gate is controlled to be turned on, the seventh transfer gate TG7 enters a conductive state and transfers the charge accumulated in the first storage node SN1 to the floating diffusion region FD.

The charge accumulated in the second storage node SN2 is transferred to the floating diffusion region FD on the basis of the control of the eighth transfer gate TG8. Specifically, when a transfer drive signal Stg8 supplied to the gate is controlled to be turned on, the eighth transfer gate TG8 enters a conductive state and transfers the charge accumulated in the second storage node SN2 to the floating diffusion region FD.

The first storage node SN1 and the second storage node SN2 function as the "accumulator" described above.

The seventh transfer gate TG7 and the eighth transfer gate TG8 are controlled so as not to be turned on at the same time.

The transfer drive signals Stg7 and Stg8 are supplied from the transfer gate drive unit 10 through the gate drive lines Lg and Lg illustrated in FIG. 2, respectively. Note that, although not illustrated in FIG. 2, the gate drive line Lg is provided corresponding to each of the transfer drive signal Stg7 and the transfer drive signal Stg8.

The floating diffusion region FD functions as a charge holder that temporarily holds the charge accumulated in the first storage node SN1 and the second storage node SN2. While the charge accumulated in the first storage node SN1 is temporarily held in the floating diffusion region FD, the charge accumulated in the second storage node SN2 is not transferred to the floating diffusion region FD.

In addition, while the charge accumulated in the second storage node SN2 is temporarily held in the floating diffusion region FD, the charge accumulated in the first storage node SN1 is not transferred to the floating diffusion region FD.

Note that the floating diffusion region FD merely has a function of temporarily holding charge, and does not function as the accumulator described above.

When a reset signal Srst supplied to a gate is controlled to be turned on, the reset transistor RST enters a conductive state and resets a potential of the floating diffusion region FD to the reference potential VDD.

The reset signal Srst is supplied from the vertical drive unit 11, for example.

The amplification transistor AMP has a source connected to the vertical signal line Lv via the selection transistor SEL, and a drain connected to a reference potential VDD to constitute a source follower circuit.

The selection transistor SEL is connected between the source of the amplification transistor AMP and the vertical signal line Lv and, when a selection signal Ssel supplied to a gate of the selection transistor SEL is controlled to be turned on, enters a conductive state and outputs the charge held in the floating diffusion region FD to the vertical signal line Lv via the amplification transistor AMP.

The selection signal Ssel is supplied from the vertical drive unit 11 via the row drive line Lh.

3. Operation of Pixel

An operation of the pixel Px will be described with reference to the accompanying drawings.

Each pixel Px acquires ranging information by using a transfer drive signal S0 having a phase difference of 0 deg for the irradiation signal Sp supplied to the light source LD, a transfer drive signal S90 having a phase difference of 90 deg, a transfer drive signal S180 having a phase difference of 180 deg, and a transfer drive signal S270 having a phase difference of 270 deg.

The transfer drive signals S0, S90, S180, and S270 are drive signals each supplied to the first transfer gate MG1 and the second transfer gate MG2. That is, the ON/OFF control of the first transfer gate MG1 and the second transfer gate MG2 as described above is performed by the transfer drive signals S0, S90, S180, and S270.

Figure 5:
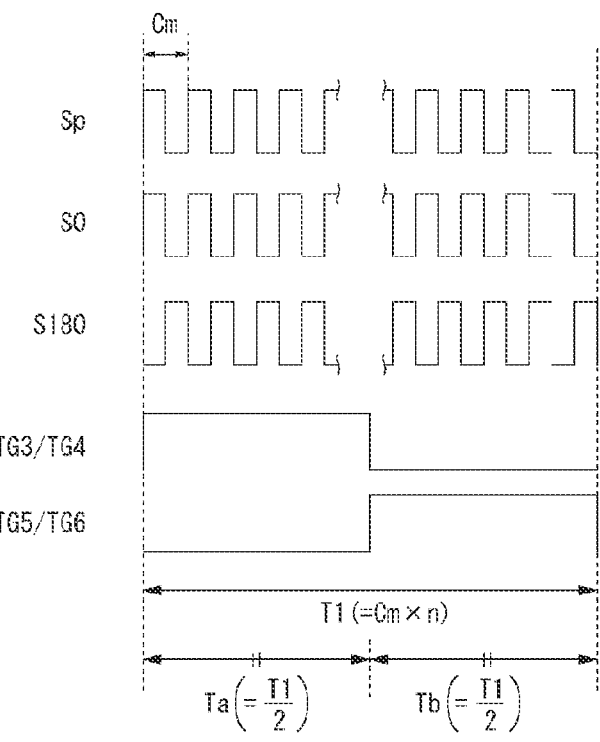
FIG. 5 is an explanatory diagram illustrating a relationship between time T1, time Ta, and time Tb.

During the time T1 illustrated in FIG. 5, the transfer drive signal supplied to the second transfer gate MG2 is an inverted signal of the transfer drive signal supplied to the first transfer gate MG1.

For example, during the time Ta which is the first half of the time T1, the transfer drive signal S0 is supplied to the first transfer gate MG1, and the transfer drive signal S180 is supplied to the second transfer gate MG2.

In addition, during the time Tb which is the second half, the transfer drive signal S180 is supplied to the first transfer gate MG1, and the transfer drive signal S0 is supplied to the second transfer gate MG2.

As a result, while a characteristic difference between the transfer gates MG1 and MG2 is offset, the charge transferred on the basis of the transfer drive signal S0 is accumulated in the first storage node SN1, and the charge transferred on the basis of the transfer drive signal S180 is accumulated in the second storage node SN2.

After completion of the processing of reading the charge accumulated in the first storage node SN1 and the processing of reading the charge accumulated in the second storage node SN2, in each pixel Px, the charge is accumulated again on the basis of the transfer drive signal S90 and the transfer drive signal S270.

Figure 6:
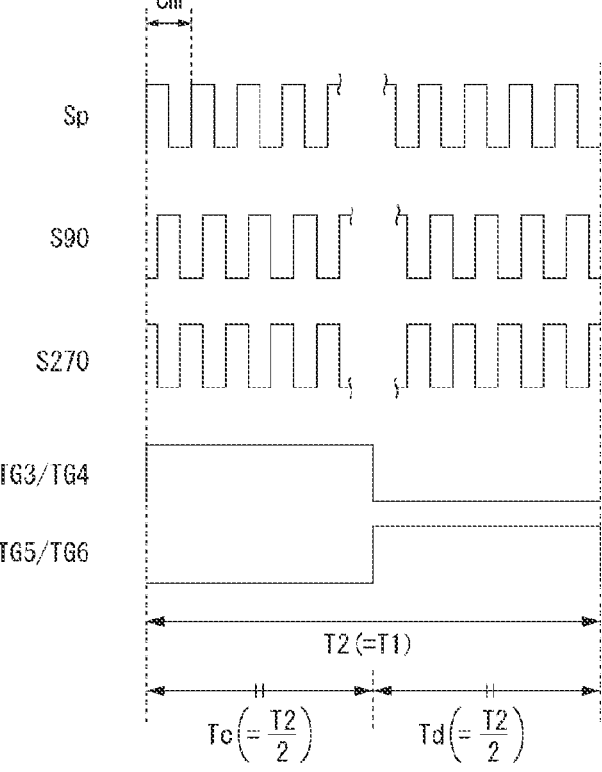
FIG. 6 is an explanatory diagram illustrating a relationship between time T2, time Tc, and time Td.

Specifically, as illustrated in FIG. 6, during a time Tc which is the first half of a time T2 having the same length as the time T1, the transfer drive signal S90 is supplied to the first transfer gate MG1, and the transfer drive signal S270 is supplied to the second transfer gate MG2.

In addition, during a time Td which is the second half of the time T2, the transfer drive signal S270 is supplied to the first transfer gate MG1, and the transfer drive signal S90 is supplied to the second transfer gate MG2.

As a result, while a characteristic difference between the transfer gates MG1 and MG2 is offset, the charge transferred on the basis of the transfer drive signal S90 is accumulated in the first storage node SN1, and the charge transferred on the basis of the transfer drive signal S270 is accumulated in the second storage node SN2.

Then, by accumulating charge (light receiving operation) during the time T1 and accumulating charge during the time T2, the distance information for every pixel Px for the subject OB can be obtained.

The above flow is summarized in FIG. 7.

As illustrated, during the time T1, the charge based on the transfer drive signal S0 is accumulated in the first storage node SN1, and the charge based on the transfer drive signal S180 is accumulated in the second storage node SN2.

The charge accumulated in each storage node is read in a time division manner during a read period RO.

Then, during the time T2, the charge based on the transfer drive signal S90 is accumulated in the first storage node SN1, and the charge based on the transfer drive signal S270 is accumulated in the second storage node SN2.

The charge accumulated in each storage node is read again in a time division manner during the read period RO.

A dead time DT is provided after the charge read period RO of the charge based on the transfer drive signal S90 and charge based on the transfer drive signal S270. During the dead time DT, preparation for starting next exposure and preparation for starting charge accumulation are performed.

Figure 8:
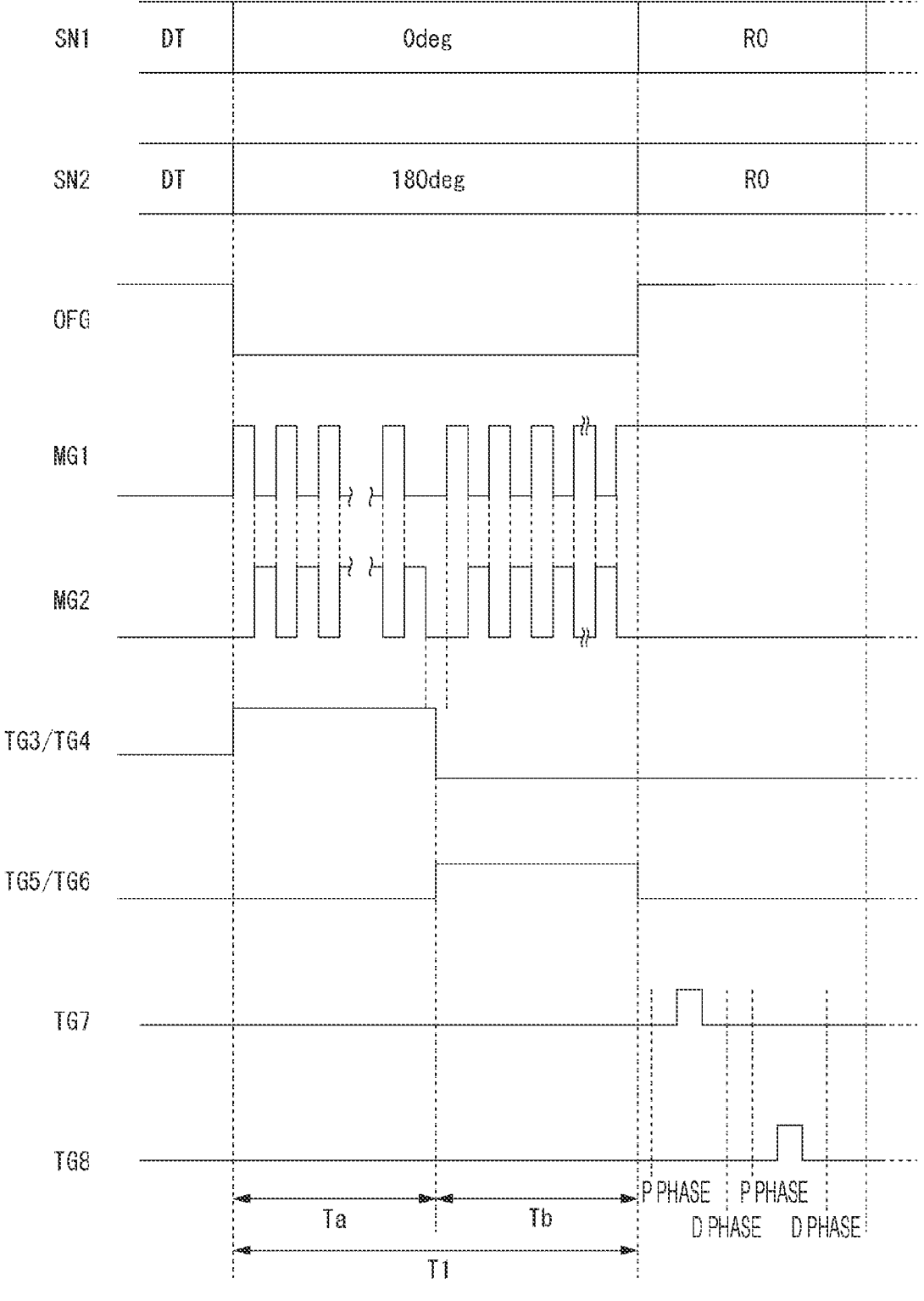
FIG. 8 is a timing chart of a circuit element in the accumulation period and the read period.

FIG. 8 illustrates a more detailed timing chart for the time T1 and the subsequent read period RO.

In the first storage node SN1, the charge based on the transfer drive signal S0 is accumulated after the end of the dead time DT. The first half of this period is the time Ta, and the second half of this period is the time Tb. Thereafter, the read period RO is provided.

In the second storage node SN2, the charge based on the transfer drive signal S180 is accumulated after the end of the dead time DT. Thereafter, the read period RO is provided.

The overflow gate OFG is controlled to be turned on during the dead time DT and the read period RO, and is controlled to be turned off during the time Ta and the time Tb which are charge accumulation periods.

The transfer drive signal S0 is supplied to the first transfer gate MG1 during the time Ta which is the first half of the accumulation period, and the transfer drive signal S180 is supplied to the first transfer gate MG1 during the time Tb which is the second half of the accumulation period. That is, the drive signal supplied to the first transfer gate MG1 is inverted at a timing of switching between the time Ta and the time Tb.

The transfer drive signal S180 is supplied to the second transfer gate MG2 during the time Ta, and the transfer drive signal S0 is supplied to the second transfer gate MG2 during the time Tb. That is, the drive signal supplied to the second transfer gate MG2 is inverted at the timing of switching between the time Ta and the time Tb.

Note that the first transfer gate MG1 and the second transfer gate MG2 are controlled to be turned off during the dead time DT and the read period RO.

The third transfer gate TG3 and the fourth transfer gate TG4 are controlled to be turned on during the time Ta, and are controlled to be turned off during the time Tb, the dead time DT, and the read period RO.

The fifth transfer gate TG5 and the sixth transfer gate TG6 are controlled to be turned on during the time Tb, and are controlled to be turned off during the time Ta, the dead time DT, and the read period RO.

The seventh transfer gate TG7 and the eighth transfer gate TG8 are each controlled to be turned on once at a time shifted in the read period RO, and are controlled to be turned off except for the ON period.

However, each of the above-described transfer gates TG including the seventh transfer gate TG7 and the eighth transfer gate TG8 can be appropriately controlled to be turned on in a period during which a reset operation is performed.

First, in a dead time DT (a timing before the dead time DT illustrated in FIG. 8) before light reception is started, a reset operation of resetting the charge of the pixel Px is performed in all the pixels. That is, for example, the overflow gate OFG, each of the reset transistors RST, and each of the transfer gates MG and TG are turned on (conductive state), and the accumulated charge of the photodiode PD and the floating diffusion region FD are reset.

After the reset of the accumulated charge, by driving each circuit element included in the pixel Px at a timing as illustrated in FIG. 8, the light receiving operation for ranging is started in all the pixels. The light receiving operation mentioned here means a light receiving operation performed for one time of ranging. That is, the operation means the light receiving operation during the time T1 illustrated in FIG. 5.

As a result, in the first storage node SN1, the charge having passed through the first transfer gate MG1 and the charge having passed through the second transfer gate MG2 are accumulated over a period of the same length on the basis of the transfer drive signal S0. In a similar manner, in the second storage node SN2, the charge having passed through the first transfer gate MG1 and the charge having passed through the second transfer gate MG2 are accumulated over a period of the same length on the basis of the transfer drive signal S180.

Subsequently, the vertical drive unit 11 performs read control for correlated double sampling (CDS) processing during the time RO.

Specifically, when the light receiving operation over the time T1 ends, the reference potential VDD of the reset transistor RST is read. This phase is referred to as a "P phase".

Subsequently, after the charge accumulated in the first storage node SN1 is transferred to the floating diffusion region FD by controlling the seventh transfer gate TG7 to be turned on, an addition voltage of the reference potential VDD of the reset transistor RST and the signal voltage of the floating diffusion region FD is read. This phase is referred to as a "D phase".

Finally, a signal obtained by subtracting the voltage signal read in the P phase from the voltage signal read in the D phase is output.

After the charge of the first storage node SN1 is read via the floating diffusion region FD by controlling the seventh transfer gate TG7, similar processing is performed for the second storage node SN2 and the eighth transfer gate TG8.

Through such processing, the column processor 12 implements the correlated double sampling processing. By performing the correlated double sampling processing, it is possible to obtain an output with less noise in which manufacturing variations of circuit elements and the like of the pixel Px, manufacturing variations of the vertical signal line Lv, and the like are canceled.

As described above, one light receiving operation ends, and the next light receiving operation starting from the reset operation is executed. Then, in the next light receiving operation, the transfer drive signal S90 and the transfer drive signal S270 are supplied to the first transfer gate MG1 and the second transfer gate.

As described above, a single based on the amount of received light by using the transfer drive signal S0 having a phase difference of 0 deg for the irradiation signal Sp supplied to the light source LD, the transfer drive signal S90 having a phase difference of 90 deg, the transfer drive signal S180 having a phase difference of 180 deg, and the transfer drive signal S270 having a phase difference of 270 deg.

The reflected light LR received by the pixel Px is delayed in accordance with the distance to the subject OB from a timing at which the light source LD emits the irradiation light LI. The ratio of the charge accumulated in the first storage node SN1 by the transfer drive signal S0, the charge accumulated in the second storage node SN2 by the transfer drive signal S180, the charge accumulated in the first storage node SN1 by the transfer drive signal S90, and the charge accumulated in the second storage node SN2 by the transfer drive signal S270 differs depending on the delay time according to the distance to the subject OB. The distance between the ranging module 1 and the subject OB can be obtained in accordance with the ratio.

4. Arrangement Example of Circuit Element

Figure 9:
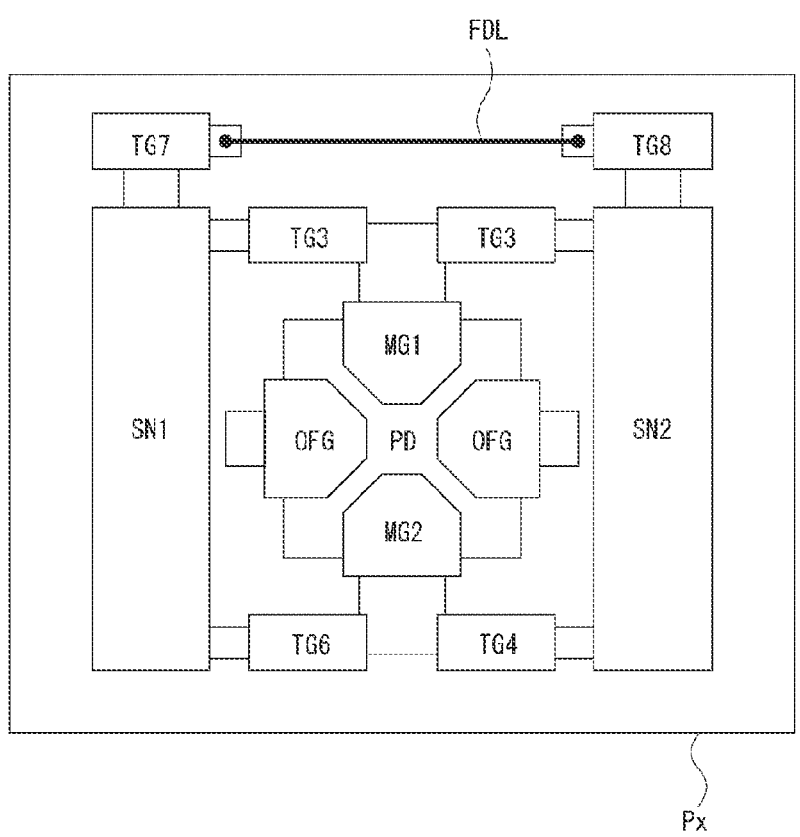
FIG. 9 is a schematic diagram illustrating an arrangement example of circuit elements such as a transfer gate and a storage node.

FIG. 9 is a plan view illustrating an arrangement example of the circuit elements such as the transistors such as each of the transfer gates MG and TG and the storage node included in the pixel Px. Note that up, down, left, and right in the description indicate up, down, left, and right in FIG. 9.

For example, in a case of the pixel Px in the backside illuminated ranging sensor 4, each circuit element is disposed on the front surface of the semiconductor substrate.

The photodiode PD is disposed at the center of the pixel Px, the first transfer gate MG1 is disposed near the upper side of the photodiode PD, and the second transfer gate MG2 is disposed near the lower side of the photodiode PD.

Furthermore, an overflow gate OFG is disposed on each of the left and right sides of the photodiode PD.

The third transfer gate TG3 and the fifth transfer gate TG5 are disposed apart from each other in the left-right direction above the photodiode PD.

The fourth transfer gate TG4 and the sixth transfer gate TG6 are disposed part from each other in the left-right direction below the photodiode PD.

The first storage node SN1 and the second storage node SN2 are disposed on different sides of the photodiode PD.

The seventh transfer gate TG7 is disposed above the first storage node SN1, and the eighth transfer gate TG8 is disposed above the second storage node SN2.

In addition, the seventh transfer gate TG7 and the eighth transfer gate TG8 are connected to the common floating diffusion region FD by being connected by a link FDL.

5. Second Embodiment

In the above embodiment, an example has been described in which after the charge is accumulated by using the transfer drive signal S0 having a phase difference of 0 deg and the transfer drive signal S180 having a phase difference of 180 deg for the irradiation signal Sp during the time T1, the charge is accumulated by using the transfer drive signal S90 having a phase difference of 90 deg and the transfer drive signal S270 having a phase difference of 270 deg during the time T2.

In the second embodiment, the charge is accumulated by using the transfer drive signals of the above four types of phase differences during the time T1.

Figure 10:
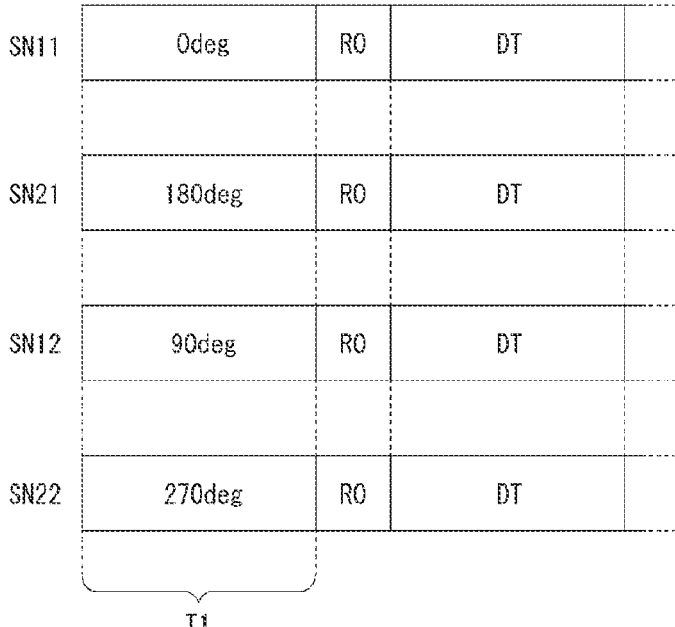
FIG. 10 is an explanatory diagram illustrating a relationship between an accumulation time, a read period, and a dead time in a second embodiment.

Specifically, the charge is accumulated in parallel by using the four storage nodes. For example, as illustrated in FIG. 10, each storage node accumulates charge on the basis of transfer drive signals having different phase differences. Note that here, the four storage nodes are storage nodes SN11, SN12, SN21, and SN22, respectively.

During the read period RO subsequent to the time T1, the charge is read from each storage node.

Figure 11:
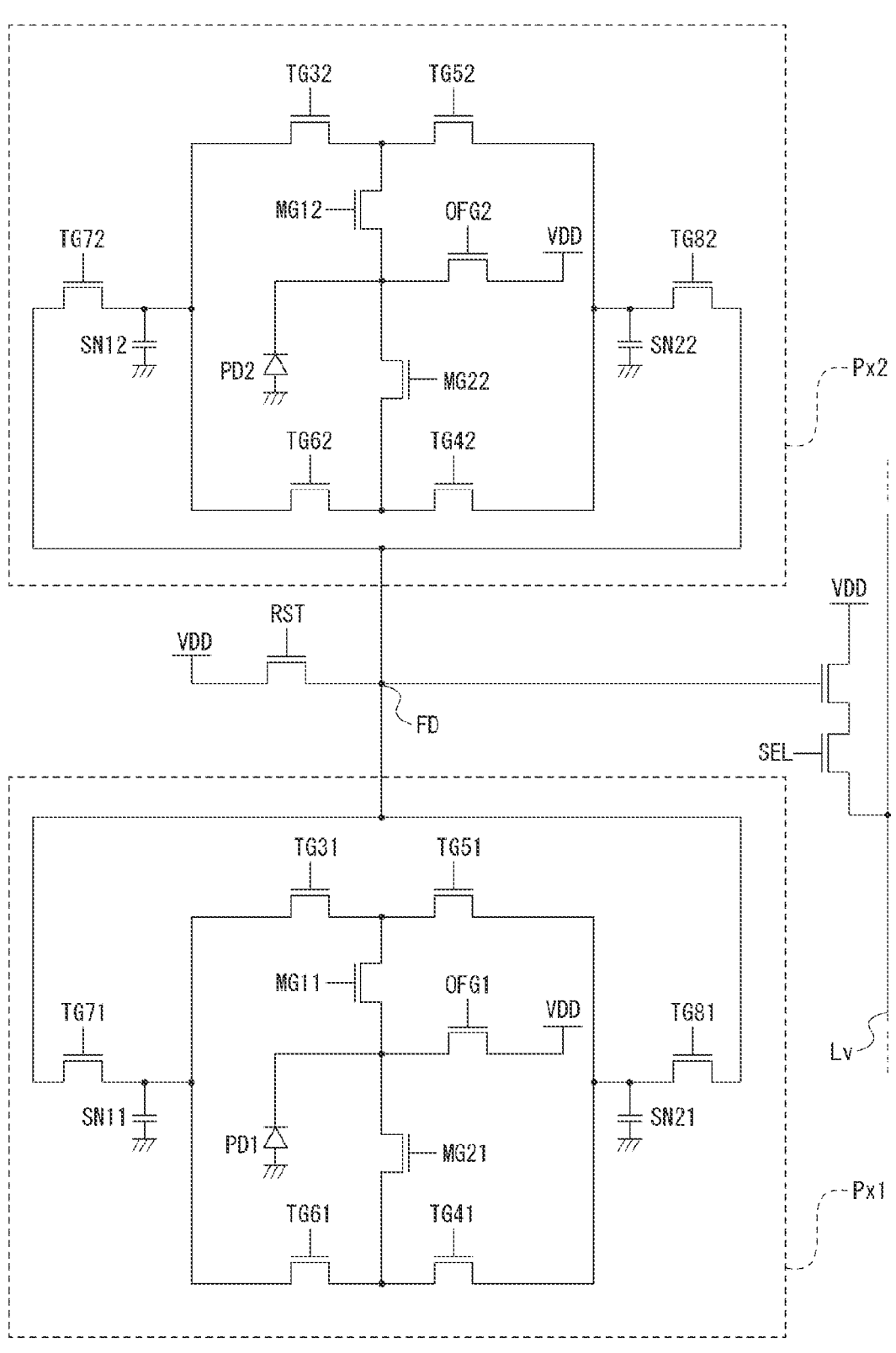
FIG. 11 is a circuit diagram illustrating an example of a circuit configuration provided in a pixel in the second embodiment.

FIG. 11 illustrates an example of a circuit configuration of the pixel Px in the second embodiment.

In the present embodiment, for example, two pixels Px1 and Px2 adjacent in the vertical direction are treated as one set. Specifically, the pixel Px1 located below includes transfer gates MG11 and MG21 toggled at a high speed with a photodiode PD1 and an overflow gate OFG1.

In addition, the pixel Px1 includes the storage nodes SN11 and SN21 that accumulate and hold the charge generated by the photodiode PD1. The pixel Px1 includes transfer gates TG31 and TG51 for distributing the charge transferred from the transfer gate MG11 to the storage nodes SN11 and SN21.

Furthermore, the pixel Px1 includes transfer gates TG61 and TG41 for distributing the charge transferred from the transfer gate MG21 to the storage nodes SN11 and SN21.

The pixel Px1 includes a transfer gate TG71 for transferring the charge accumulated in the storage node SN11 to the floating diffusion region FD, and a transfer gate TG81 for transferring the charge accumulated in the storage node SN21 to the floating diffusion region FD.

The photodiode PD1, the overflow gate OFG1, the storage nodes SN11 and SN21, the transfer gates MG11 and MG21, the transfer gates TG31, TG41, TG51, and TG61, and the transfer gates TG71 and TG81 included in the pixel Px1 have configurations similar to the configurations of the photodiode PD, the overflow gate OFG, the first storage node SN1, the second storage node SN2, the first transfer gate MG1, the second transfer gate MG2, the third transfer gate TG3, the fourth transfer gate TG4, the fifth transfer gate TG5, the sixth transfer gate TG6, the seventh transfer gate TG7, and the eighth transfer gate TG8 in the first embodiment, respectively.

Furthermore, the pixel Px2 has a configuration similar to the configuration of the pixel Px1 and includes a photodiode PD2, an overflow gate OFG2, storage nodes SN12 and SN22, transfer gates MG12 and MG22, transfer gates TG32, TG42, TG52, and TG62, and transfer gates TG72 and TG82.

In addition, the floating diffusion region FD, the reset transistor RST, the amplification transistor AMP, and the selection transistor SEL described above are provided in any one of the pixel Px1 or the pixel Px2.

Note that the floating diffusion region FD, the reset transistor RST, the amplification transistor AMP, and the selection transistor SEL is not required to be included in any of the pixels Px1 or Px2.

The charge is accumulated in the storage nodes SN11 and SN21 and the charge is accumulated in the storage nodes SN12 and SN22 during the time T1 as in the first embodiment.

Figure 12:
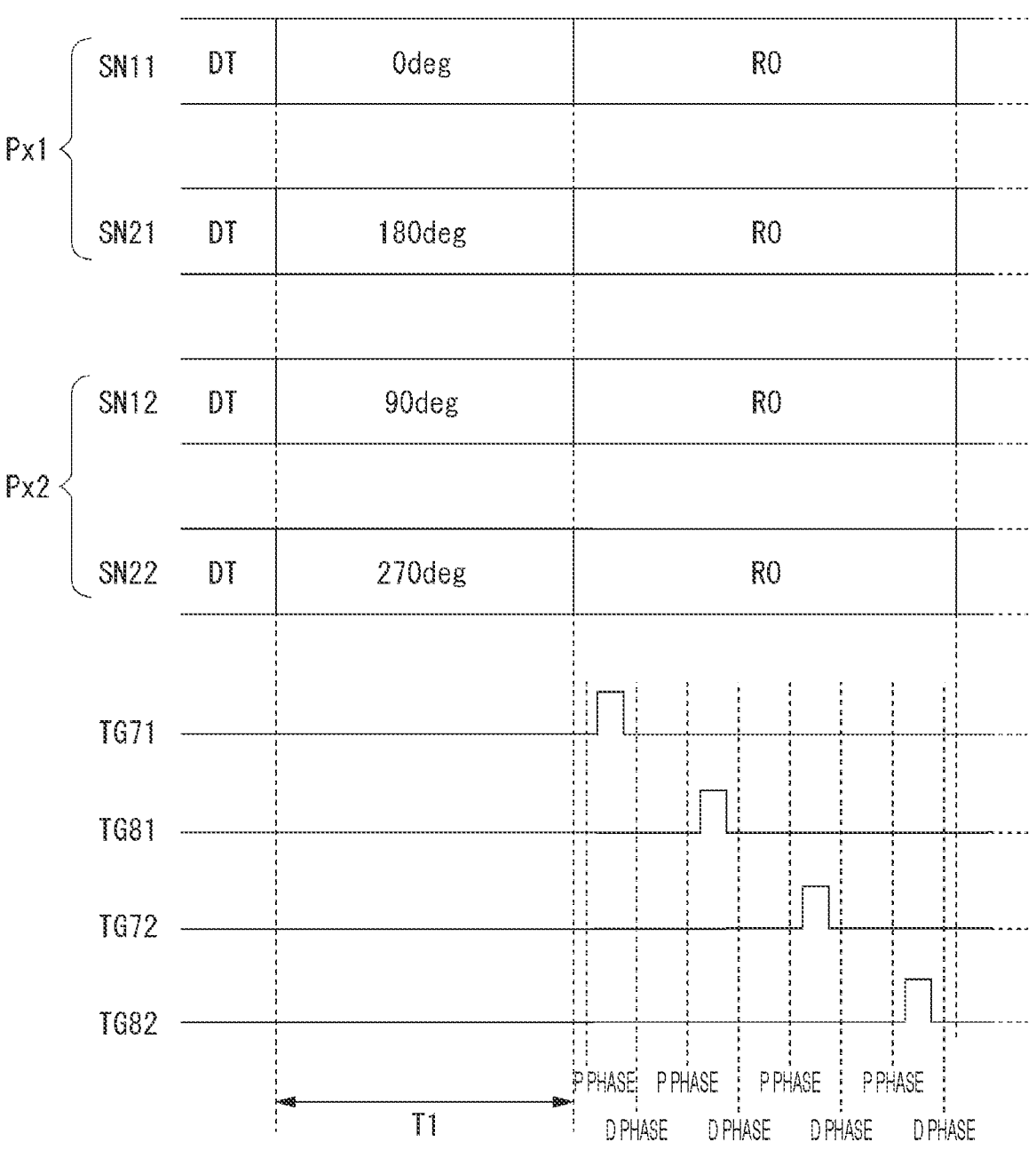
FIG. 12 is a timing chart for describing an operation in the read period in the second embodiment.

A control state of the transfer gates TG71, TG81, TG72, and TG82 during the read period RO after the charge is accumulated in each storage node will be described with reference to FIG. 12.

During the read period RO, first, after reading in the P phase described above is performed, the transfer gate TG71 is controlled to be turned on. As a result, the charge accumulated in the storage node SN11, that is, the charge accumulated in accordance with the transfer drive signal S0 having a phase difference of 0 deg is transferred to the floating diffusion region FD. Thereafter, the charge is read in the D-phase.

Next, after the reading in the P phase is performed again, the transfer gate TG81 is controlled to be turned on. As a result, the charge accumulated in the storage node SN21, that is, the charge accumulated in accordance with the transfer drive signal S180 having a phase difference of 180 deg is transferred to the floating diffusion region FD. Subsequently, the charge is read in the D-phase.

Next, after the reading in the P phase is performed again, the transfer gate TG72 is controlled to be turned on. As a result, the charge accumulated in the storage node SN12, that is, the charge accumulated in accordance with the transfer drive signal S90 having a phase difference of 90 deg is transferred to the floating diffusion region FD. Subsequently, the charge is read in the D-phase.

Finally, after the reading in the P phase is performed again, the transfer gate TG82 is controlled to be turned on. As a result, the charge accumulated in the storage node SN22, that is, the charge accumulated in accordance with the transfer drive signal S270 having a phase difference of 270 deg is transferred to the floating diffusion region FD. Subsequently, the charge is read in the D-phase.

In this manner, the respective charges accumulated by using the transfer drive signals of the four types of phase differences are sequentially read.

By treating the two pixels Px1 and Px2 as a set, although the resolution of the distance image Di decreases, the time required for charge accumulation is only the time T1. It is therefore possible to improve the accuracy of the distance image Di in a case where the subject OB is a moving subject or the like. In addition, since the time required to generate one distance image Di is reduced, a large number of distance images Di can be generated in the same time, and time resolution can be enhanced.

Note that, in the present embodiment, an example in which two pixels adjacent in the vertical direction are treated as one set has been described. However, the above operation may be achieved by treating two pixels adjacent in the horizontal direction as one set.

6. Modification

In the example described above, as illustrated in FIG. 8, a case has been described where the third transfer gate TG3, the fourth transfer gate TG4, the fifth transfer gate TG5, and the sixth transfer gate TG6 are driven by two levels of on and off.

In the present modification, an example will be described where the third transfer gate TG3, the fourth transfer gate TG4, the fifth transfer gate TG5, and the sixth transfer gate TG6 are driven by three levels.

The third transfer gate TG3, the fourth transfer gate TG4, the fifth transfer gate TG5, and the sixth transfer gate TG6 can be driven with negative bias in addition to ON/OFF driving, for example.

Figure 13:
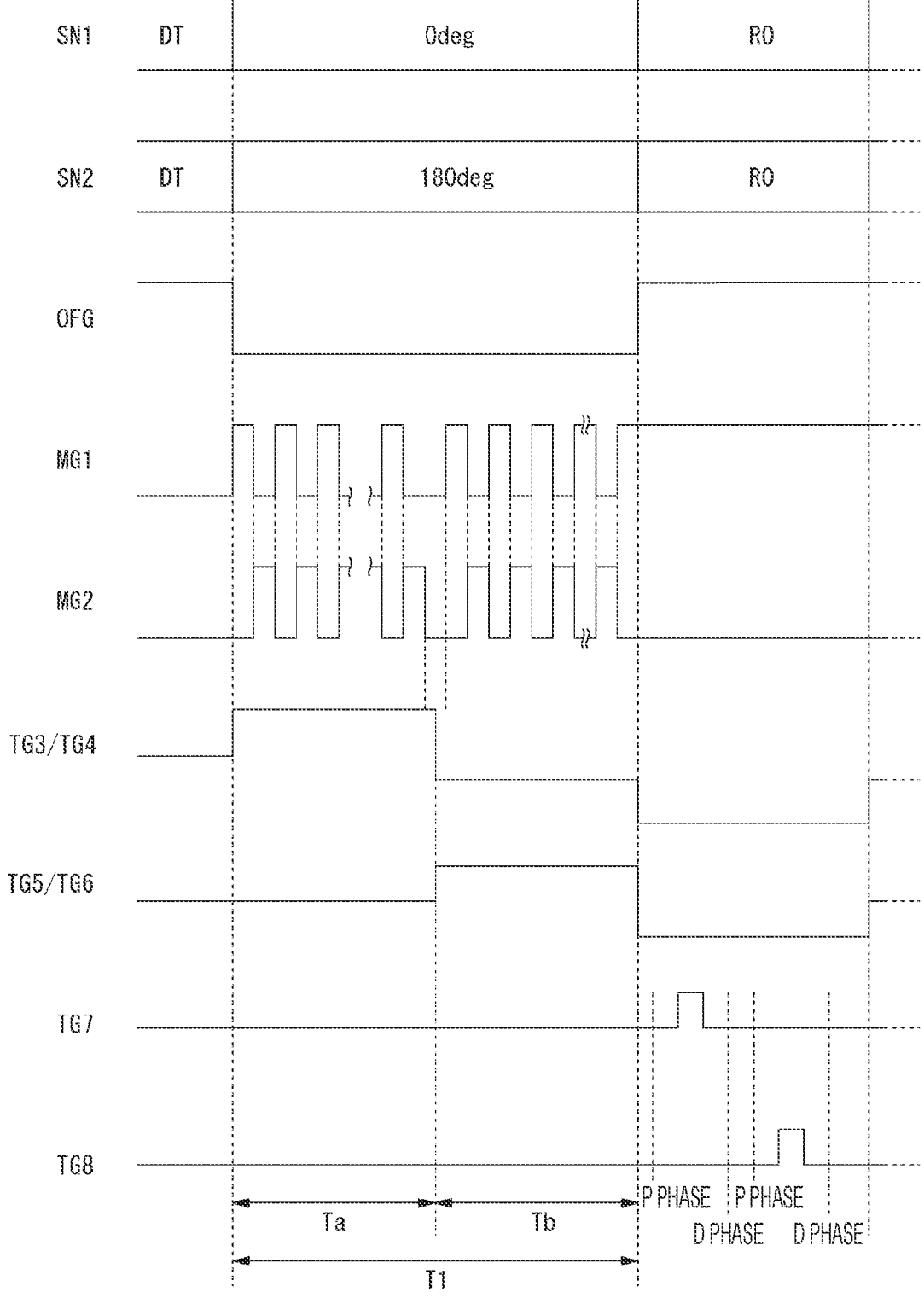
FIG. 13 is a timing chart of a circuit element provided in a pixel described in a modification.

Then, as illustrated in FIG. 13, the third transfer gate TG3, the fourth transfer gate TG4, the fifth transfer gate TG5, and the sixth transfer gate TG6 are driven with negative bias during the read period RO.

As a result, generation of a leakage current is suppressed, and noise is less likely to be mixed when charge is read from each storage node.

Furthermore, in each of the examples described above, an example has been described in which the phase of the transfer drive signal supplied to the first transfer gate MG1 and the second transfer gate MG2 or the transfer gates MG11, MG21, MG12, and MG22 is changed for the irradiation signal Sp which is a constant pulse signal.

Alternatively, a constant pulse signal and an inverted signal of the constant pulse signal may be supplied to the first transfer gate MG1 and the second transfer gate MG2, and accordingly, the irradiation signal Sp may have a phase shifted by 180 deg between the time Ta and the time Tb.

With such a mode, the above-described various functions and effects can be obtained.

Furthermore, in the above-described example, an example has been described in which both the first storage node SN1 and the second storage node SN2 are MOS capacitors. However, the first storage node SN1 and the second storage node SN2 may be formed as floating diffusion regions.

7. Summary

As described in each example described above, the ranging sensor 4 includes the photoelectric conversion element (photodiode PD), the first storage node SN1 (storage node SN11, SN12) and the second storage node SN2 (storage node SN21, SN22) that accumulate charge transferred from the photoelectric conversion element, and the first transfer gate (transfer gate MG11, MG12) and the second transfer gate MG2 (transfer gate MG21, MG22) connected to the photoelectric conversion element so as to branch and transfer the charge generated in the photoelectric conversion element to different paths.

In addition, the ranging sensor 4 includes the pixel Px including the third transfer gate TG3 (transfer gate TG31, TG32) connected between the first storage node SN1 and the first transfer gate MG1, the fourth transfer gate TG4 (transfer gate TG41, TG42) connected between the second storage node SN2 and the second transfer gate MG2, the fifth transfer gate TG5 (transfer gate TG51, TG52) connected between the first storage node SN1 and the second transfer gate MG2, and the sixth transfer gate TG6 (transfer gate TG61, TG62) connected between the second storage node SN2 and the first transfer gate MG1.

Furthermore, the transfer gate drive unit 10 that drives each of the transfer gates MG and TG are included.

As a result, at least two paths for accumulating charge are provided in the first storage node SN1. In a similar manner, at least two paths for accumulating charge are provided in the second storage node SN2.

It is therefore possible to drive each of the transfer gates MG and TG so as to offset the characteristic difference between the first transfer gate MG1 and the second transfer gate MG2.

Figure 14:
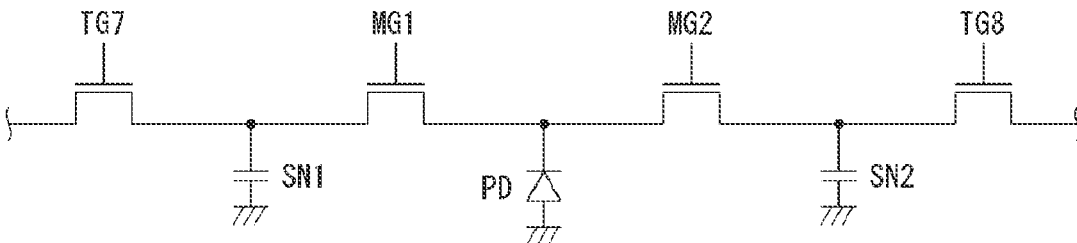
FIG. 14 is a diagram illustrating an example of a circuit configuration of a conventional ranging sensor.

For example, in a conventional configuration (see FIG. 14) in which one first transfer gate MG1 is disposed between the photodiode PD and the first storage node SN1 and one second transfer gate MG2 is disposed between the photodiode PD and the second storage node SN2, the charge having passed through the first transfer gate MG1 and the charge having passed through the second transfer gate MG2 cannot be collected to the first storage node SN1. Therefore, in order to cancel the characteristic difference between the first transfer gate MG1 and the second transfer gate MG2, it is necessary to use both the detection signal corresponding to the charge accumulated during the time T1 and the detection signal corresponding to the charge accumulated during the time T2. Then, the time T1 has a length necessary for accumulating charge necessary for obtaining a sufficient detection signal in each storage node, and is difficult to be reduced. Specifically, by using both the detection signal according to the charge accumulated in the first storage node SN1 during the time T1 by driving the first transfer gate MG1 by using the transfer drive signal S0 and the detection signal according to the charge accumulated in the second storage node SN2 during the time T2 by driving the second transfer gate MG2 by using the transfer drive signal S0, it is possible to obtain a detection signal in which the phase shift amount is 0 deg and a difference in circuit characteristics is offset. At this time, by using the detection signal according to the charge accumulated in the second storage node SN2 during the time T1 and the detection signal according to the charge accumulated in the first storage node SN1 during the time T2, it is possible to obtain a detection signal in which the phase shift amount is 180 deg and the difference in circuit characteristics is offset.

Figure 15:
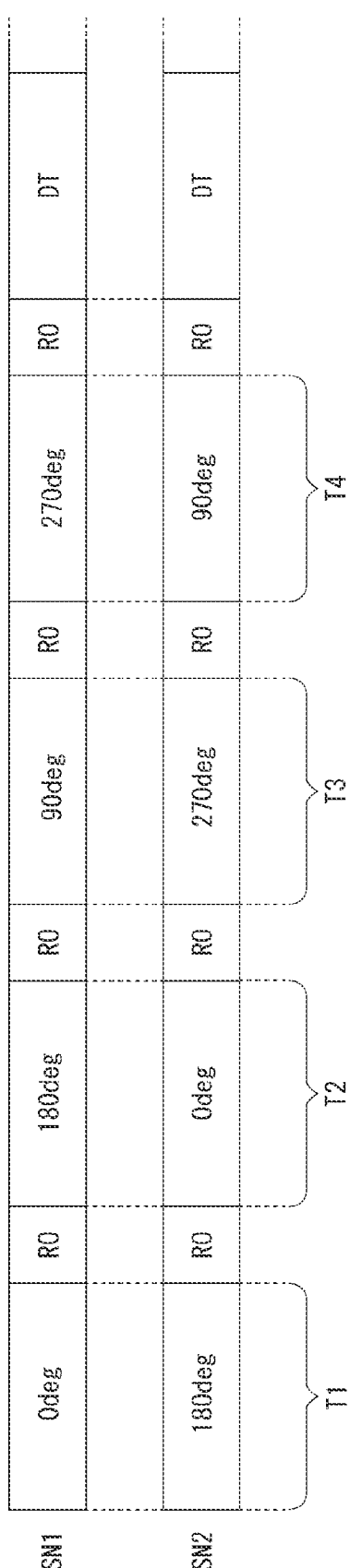
FIG. 15 is a diagram illustrating a relationship between an accumulation time, a read period, and a dead time in a conventional method.

That is, in order to obtain four detection signals having different phase shift amounts as described above, it is necessary to repeat a light receiving period set to the same period as the time T1 four times (time T1, T2, T3, and T4 in FIG. 15).

However, in a case where each of the transfer gates is connected as in the configuration of the present technology, it is possible to offset the characteristic difference of the transfer gates by providing a first accumulation phase (time T1) for supplying the drive signal (time Ta) having a phase difference of 0 deg and the drive signal (time Tb) having a phase difference of 180 deg to the first transfer gate MG1 and supplying the drive signal (time Ta) having a phase difference of 180 deg and a drive signal (time Tb) having a phase difference of 0 deg to the second transfer gate MG2 for the irradiation signal Sp supplied to the light source LD, and by providing a second accumulation phase (time T2) for supplying the drive signal (time Tc) having a phase difference of 90 deg and the drive signal (time Td) having a phase difference of 270 deg to the first transfer gate MG1 and supplying the drive signal (time Tc) having a phase difference of 270 deg and the drive signal (time Td) having a phase difference of 90 deg to the second transfer gate. Then, during the time T1 and the time T2, the charge necessary for obtaining a sufficient detection signal is accumulated in each storage node.

Note that by increasing the time for switching between the first transfer gate MG1 and the second transfer gate MG2 (that is, by increasing the light emission cycle Cm), it is also possible to make it difficult to generate a characteristic difference. However, when the switching time is increased, there is a problem that responsiveness to movement of the subject OB or the like is deteriorated. The present configuration can suppress deterioration of ranging performance due to a difference in circuit characteristics such as a characteristic difference of a transfer gate while responding to movement of the subject OB or the like at high speed.

As described with reference to FIG. 4 and the like, the pixel Px may include the floating diffusion region FD, the seventh transfer gate TG7 (transfer gate TG71, TG72) connected between the first storage node SN1 (storage node SN11, SN12) and the floating diffusion region FD, and the eighth transfer gate TG8 (transfer gate TG81, TG82) connected between the second storage node SN2 (storage node SN21, SN22) and the floating diffusion region FD.

As a result, the floating diffusion region FD used for reading from the first storage node SN1 and the second storage node SN2 and a reading circuit (the amplification transistor AMP, the selection transistor SEL, and the like) from the floating diffusion region FD are common.

Therefore, it is not necessary to consider a characteristic difference between the floating diffusion region FD and the reading circuit from the floating diffusion region FD. For example, in a case where the distance image Di or the like is output on the basis of the ratio between an accumulated charge amount of the first storage node SN1 and an accumulated charge amount of the second storage node SN2 read via the floating diffusion region FD, the distance image Di with high accuracy can be output.

Furthermore, by having a common portion, the configuration of the circuit can be reduced.

As described with reference to FIG. 4 and the like, the pixel Px may include the overflow gate OFG that discharges the charge generated in the photoelectric conversion element (photodiode PD).

As a result, overflow of the charge generated in the photoelectric conversion element is suppressed.

That is, an anti-blooming function works, and the generated distance image Di and the like can be made highly accurate.

As described with reference to FIGS. 5, 8, 11, and the like, the photoelectric conversion element (photodiode PD) in the ranging sensor 4 may receive reflected light of light emitted by the light emitter 2 that performs pulse light emission, and the transfer gate drive unit 10 may perform the ON/OFF control of the first transfer gate (transfer gate MG11, MG12) and the second transfer gate MG2 (transfer gate MG21, MG22) by a pulse signal (irradiation signal Sp) that drives the light emitter 2.

That is, the first transfer gate MG1 and the second transfer gate MG2 are alternately controlled to be turned on.

This control makes it possible to function as a time-of-flight ranging sensor.

As described with reference to FIGS. 5, 8, 13, and the like, the transfer gate drive unit 10 in the ranging sensor 4 may control each of the transfer gates MG and TG so that the charge is accumulated in the second storage node SN2 (storage node SN21, SN22) via the second transfer gate MG2 (transfer gate MG21, MG22) while the charge is accumulated in the first storage node SN1 (storage node SN11, SN12) via the first transfer gate MG1 (transfer gate MG11, MG12), and the transfer gate drive unit 10 may control each of the transfer gates MG and TG so that the charge is accumulated in the first storage node SN1 via the second transfer gate MG2 while the charge is accumulated in the second storage node SN2 via the first transfer gate MG1.

As a result, the charge transferred by the first transfer gate MG1 and the charge transferred by the second transfer gate MG2 are divided and accumulated in the first storage node SN1 and the second storage node SN2.

It is therefore possible to control the transfer gates MG and TG so as to cancel the characteristic difference between the first transfer gate MG1 and the second transfer gate MG2.

As described with reference to FIGS. 8, 13, and the like, the transfer gate drive unit 10 in the ranging sensor 4 may control the fifth transfer gate TG5 (transfer gate TG51, TG52) to be turned off while controlling the third transfer gate TG3 (transfer gate TG31, TG32) to be turned on, and may control the sixth transfer gate TG6 (transfer gate TG61, TG62) to be turned off while controlling the fourth transfer gate TG4 (transfer gate TG41, TG42) to be turned on.

As a result, the charge transferred via the first transfer gate MG1 (transfer gate MG11, MG12) is prevented from being simultaneously transferred to both the first storage node SN1 (storage node SN11, SN12) and the second storage node SN2 (storage node SN21, SN22). In a similar manner, the charge transferred via the second transfer gate MG2 (transfer gate MG21, MG22) is prevented from being simultaneously transferred to both the first storage node SN1 and the second storage node SN2.

This configuration makes it possible to function as a time-of-flight ranging sensor.

As described with reference to FIGS. 8 and 13, the transfer gate drive unit 10 in the ranging sensor 4 may control the third transfer gate TG3 (transfer gate TG31, TG32) and the fourth transfer gate TG4 (transfer gate TG41, TG42) to be turned on during a first period (time Ta, Time Tc), and control the fifth transfer gate TG5 (transfer gate TG51, TG52) and the sixth transfer gate TG6 (transfer gate TG61, TG62) to be turned on during a second period (time Tb, time Td) different from the first period, and the length of the first period may be equal to the length of the second period.

As a result, the length of the period during which the charge is accumulated in the first storage node SN1 (storage node SN11, SN12) via the third transfer gate TG3 may be equal to the length of the period during which the charge is accumulated in the first storage node SN1 via the sixth gate. In a similar manner, the length of the period during which the charge is accumulated in the second storage node SN2 (storage node SN21, SN22) via the fourth gate is equal to the length of the period during which the charge is accumulated in the second storage node SN2 via the fifth gate.

In other words, the length of the period (time Ta, time Tc) during which the charge is transferred to the first storage node SN1 via the first transfer gate MG1 (transfer gate MG11, MG12) and accumulated and the length of the period (time Tb, time Td) during which the charge is transferred to the first storage node SN1 via the second transfer gate MG2 (transfer gate MG21, MG22) and accumulated are the same. The length of the period (time Tb, time Td) during which the charge is transferred to the second storage node SN2 via the first transfer gate MG1 and accumulated and the length of the period (time Ta, time Tc) during which the charge is transferred to the second storage node SN2 via the second transfer gate MG2 and accumulated are the same.

Therefore, the characteristic difference between the first transfer gate MG1 and the second transfer gate MG2 is canceled, and highly accurate ranging data can be output. In particular, in the time-of-flight ranging sensor, a frequency of switching between the first transfer gate MG1 and the second transfer gate MG2 is several MHz to several hundreds of MHz, and thus the characteristic difference between both the transfer gates easily affects a ranging result. Since the first period and the second period have the same time length as in the present configuration, the characteristic difference between the first transfer gate MG1 and the second transfer gate MG2 is canceled, and therefore the ranging performance can be significantly improved.

As described with reference to FIGS. 8 and 13, in the ranging sensor 4, the length of the period (time Ta) during which the charge is accumulated via the first transfer gate MG1 (transfer gate MG11, MG12) and the length of the period (time Tb) during which the charge is accumulated via the second transfer gate MG2 (transfer gate MG21, MG22) in the first storage node SN1 (storage node SN11, SN12) may be both equal to the length of the period (time Tb) during which the charge is accumulated via the first transfer gate MG1 and the length of the period (time Ta) during which the charge is accumulated via the second transfer gate MG2 in the second storage node SN2 (storage node SN21, SN22).

As a result, the length of the period during which the charge is transferred to the first storage node SN1 via the first transfer gate MG1 and accumulated and the length of the period during which the charge is transferred to the first storage node SN1 via the second transfer gate MG2 and accumulated are the same. The length of the period during which the charge is transferred to the second storage node SN2 via the first transfer gate MG1 and accumulated and the length of the period during which the charge is transferred to the second storage node SN2 via the second transfer gate MG2 and accumulated are the same.

Therefore, the characteristic difference between the first transfer gate MG1 and the second transfer gate MG2 is canceled, and highly accurate ranging data can be output. In particular, in the time-of-flight ranging sensor, a frequency of switching between the first transfer gate MG1 and the second transfer gate MG2 is several MHz to several hundreds of MHz, and thus the characteristic difference between both the transfer gates easily affects a ranging result. Since the first period and the second period have the same time length as in the present configuration, the characteristic difference between the first transfer gate MG1 and the second transfer gate MG2 is canceled, and therefore the ranging performance can be significantly improved.

Note that the length of the period during which the charge is accumulated via the first transfer gate MG1 in the first storage node SN1 can be interpreted as, in a narrower sense, the length of the period during which both the first transfer gate MG1 and the third transfer gate TG3 are controlled to be turned on during the time Ta. That is, the length of the period can be obtained by multiplying one accumulation time calculated as Cm/2 which is a half of the light emission cycle Cm by the number of times of accumulation (the number of times both the first transfer gate MG1 and the third transfer gate TG3 are controlled to be turned on).

In a similar manner, in a narrow sense, the length of the period during which the charge is accumulated via the second transfer gate MG2 in the first storage node SN1 can be interpreted as a length that can be obtained by multiplying Cm/2 by the number of times of accumulation (the number of times both the second transfer gate MG2 and the sixth transfer gate TG6 are controlled to be turned on). The length of the period in which the charge is accumulated via the first transfer gate MG1 in the second storage node SN2 can be interpreted as a length that can be obtained by multiplying Cm/2 by the number of times of accumulation (the number of times both the first transfer gate MG1 and the fifth transfer gate TG5 are controlled to be turned on). The length of the period during which the charge is accumulated via the second transfer gate MG2 in the second storage node SN2 can be interpreted as a length that can be obtained by multiplying Cm/2 by the number of times of accumulation (the number of times both the second transfer gate MG2 and the fourth transfer gate TG4 are controlled to be turned on).

As described in the modification with reference to FIG. 13, the transfer gate drive unit 10 in the ranging sensor 4 may drive, by three levels, each of the third transfer gate TG3 (transfer gate TG31, TG32), the fourth transfer gate TG4 (transfer gate TG41, TG42), the fifth transfer gate TG5 (transfer gate TG51, TG52), and the sixth transfer gate TG6 (transfer gate TG61, TG62).

As a result, for example, it is possible to perform driving with negative bias in addition to ON/OFF driving.

It is therefore possible to prevent an unintended charge from being accumulated in the first storage node SN1 (storage node SN11, SN12) and the second storage node SN2 (storage node SN21, SN22), and thus, it is possible to prevent a decrease in accuracy of the ranging data.

As described in the modification with reference to FIG. 13, the driving by three levels may include driving with negative bias.

The driving with negative bias suppresses accumulation of an unintended charge in the first storage node SN1 (storage node SN11, SN12) and the second storage node SN2 (storage node SN21, SN22).

It is therefore possible to prevent a decrease in accuracy of the ranging data.

As described in the modification with reference to FIG. 13, the transfer gate drive unit 10 in the ranging sensor 4 may drive, with negative bias, the third transfer gate TG3 (transfer gate TG31, TG32), the fourth transfer gate TG4 (transfer gate TG41, TG42), the fifth transfer gate TG5 (transfer gate TG51, TG52), and the sixth transfer gate TG6 (transfer gate TG61, TG62) during the read period RO of the charge accumulated in the first storage node SN1 (storage node SN11, SN12) and the second storage node SN2 (storage node SN21, SN22).

As a result, it is possible to suppress accumulation of an unintended charge in the first storage node SN1 and the second storage node SN2 during the read period RO.

It is therefore possible to prevent a decrease in accuracy of the ranging data.

As described with reference to FIG. 2 and the like, the ranging sensor 4 may include a plurality of pixels Px.

As a result, the distance image Di including a plurality of pieces of distance information for every pixel Px is generated.

Then, in each pixel Px, the detection signal in which the characteristic difference between the first transfer gate MG1 (transfer gate MG11, MG12) and the second transfer gate MG2 (transfer gate MG21, MG22) is offset is output, and thus the distance image Di with high accuracy can be generated.

As described with reference to FIG. 2 and the like, the ranging sensor 4 may include the pixel array unit 8 in which the pixels Px are two-dimensionally arrayed.

As a result, the distance image Di as two-dimensional data is generated.

Then, the detection signal is output in which the characteristic difference between the first transfer gate MG1 (transfer gate MG11, MG12) and the second transfer gate MG2 (transfer gate MG21, MG22) is offset in each pixel, and therefore, the two-dimensional distance image Di with high accuracy can be generated.

Note that effects described in the present description are merely examples and are not limited, and other effects may be provided.

8. Present Technology

Note that the present technology can also adopt the following configurations.

(1)

A ranging sensor including:

a pixel including a photoelectric conversion element, a first storage node and a second storage node that store charge transferred from the photoelectric conversion element, a first transfer gate and a second transfer gate connected to the photoelectric conversion element so as to branch and transfer the charge generated in the photoelectric conversion element to different paths, a third transfer gate connected between the first storage node and the first transfer gate, a fourth transfer gate connected between the second storage node and the second transfer gate, a fifth transfer gate connected between the first storage node and the second transfer gate, and a sixth transfer gate connected between the second storage node and the first transfer gate; and a transfer gate drive unit that drives each of the first to sixth transfer gates.

(2)

The ranging sensor according to (1) described above, in which the pixel includes a floating diffusion region, a seventh transfer gate connected between the first storage node and the floating diffusion region, and an eighth transfer gate connected between the second storage node and the floating diffusion region.

(3)

The ranging sensor according to (1) or (2) described above, in which the pixel includes an overflow gate that discharges the charge generated in the photoelectric conversion element.

(4)

The ranging sensor according to any of (1) to (3) described above, in which the photoelectric conversion element receives reflected light of light emitted by a light emitter that performs pulse light emission, and the transfer gate drive unit performs ON/OFF control of the first transfer gate and the second transfer gate by a pulse signal that drives the light emitter.

(5)

The ranging sensor according to any of (1) to (4) described above, in which the transfer gate drive unit controls each of the first to sixth transfer gates such that the charge is accumulated in the second storage node via the second transfer gate while the charge is accumulated in the first storage node via the first transfer gate, and controls each of the first to sixth transfer gates such that the charge is accumulated in the first storage node via the second transfer gate while the charge is accumulated in the second storage node via the first transfer gate.

(6)

The ranging sensor according to (5) described above, in which the transfer gate drive unit controls the fifth transfer gate to be turned off while controlling the third transfer gate to be turned on, and controls the sixth transfer gate to be turned off while controlling the fourth transfer gate to be turned on.

(7)

The ranging sensor according to (6) described above, in which the transfer gate drive unit controls the third transfer gate and the fourth transfer gate to be turned on during a first period and controls the fifth transfer gate and the sixth transfer gate to be turned on during a second period different from the first period, and a length of the first period is equal to a length of the second period.

(8)

The ranging sensor according to (6) or (7) described above, in which a length of a period during which the charge is accumulated via the first transfer gate and a length of a period during which the charge is accumulated via the second transfer gate in the first storage node are both equal to a length of a period during which the charge is accumulated via the first transfer gate and a length of a period during which the charge is accumulated via the second transfer gate in the second storage node.

(9)

The ranging sensor according to any of (1) to (8) described above, in which the transfer gate drive unit drives each of the third transfer gate, the fourth transfer gate, the fifth transfer gate, and the sixth transfer gate by three levels.

(10)

The ranging sensor according to (9) described above, in which the driving by three levels includes driving with negative bias.

(11)

The ranging sensor according to (10) described above, in which the transfer gate drive unit drives, with negative bias, the third transfer gate, the fourth transfer gate, the fifth transfer gate, and the sixth transfer gate during a read period of the charge accumulated in the first storage node and the second storage node.

(12)

The ranging sensor according to any of (1) to (11) described above, further including a plurality of the pixels.

(13)

The ranging sensor according to any of (1) to (12) described above, further including a pixel array unit in which the pixels are two-dimensionally arrayed.

(14)

A ranging module including:

a light emitter that performs pulse light emission; and a ranging sensor including a pixel including a photoelectric conversion element that receives reflected light of light emitted from the light emitter, the ranging sensor including a transfer gate drive unit that drives a plurality of transfer gates, in which the pixel includes the photoelectric conversion element, a first storage node and a second storage node that store charge transferred from the photoelectric conversion element, a first transfer gate and a second transfer gate connected to the photoelectric conversion element so as to branch and transfer the charge generated in the photoelectric conversion element to different paths, a third transfer gate connected between the first storage node and the first transfer gate, a fourth transfer gate connected between the second storage node and the second transfer gate, a fifth transfer gate connected between the first storage node and the second transfer gate, and a sixth transfer gate connected between the second storage node and the first transfer gate.

REFERENCE SIGNS LIST

1 Ranging module
2 Light emitter
4 Ranging sensor
5 Light emission controller
8 Pixel array unit
10 Transfer gate drive unit
LD Light source
Sp Irradiation signal
Ta, Tb, Tc, Td Time
RO Read period
Px, Px1, Px2 Pixel
PD Photodiode
FD Floating diffusion region
MG1 First transfer gate
MG2 Second transfer gate
SN1 First storage node
SN2 Second storage node
TG3 Third transfer gate
TG4 Fourth transfer gate
TG5 Fifth transfer gate
TG6 Sixth transfer gate
TG7 Seventh transfer gate
TG8 Eighth transfer gate
MG11, MG12 Transfer gate
MG21, MG22 Transfer gate
SN11, SN12 Storage node
SN21, SN22 Storage node
TG31, TG32 Transfer gate
TG41, TG42 Transfer gate
TG51, TG52 Transfer gate
TG61, TG62 Transfer gate
TG71, TG72 Transfer gate
TG81, TG82 Transfer gate
OFG, OFG1, OFG2 Overflow gate

The invention claimed is:

1. A ranging sensor comprising:

a pixel including a photoelectric conversion element, a first storage node and a second storage node that store charge transferred from the photoelectric conversion element, a first transfer gate and a second transfer gate connected to the photoelectric conversion element so as to branch and transfer the charge generated in the photoelectric conversion element to different paths, a third transfer gate connected between the first storage node and the first transfer gate, a fourth transfer gate connected between the second storage node and the second transfer gate, a fifth transfer gate connected between the first storage node and the second transfer gate, and a sixth transfer gate connected between the second storage node and the first transfer gate; and a transfer gate drive unit that drives each of the first to sixth transfer gates.

2. The ranging sensor according to claim 1, wherein the pixel includes a floating diffusion region, a seventh transfer gate connected between the first storage node and the floating diffusion region, and an eighth transfer gate connected between the second storage node and the floating diffusion region.

3. The ranging sensor according to claim 1, wherein
the pixel includes an overflow gate that discharges the charge generated in the photoelectric conversion element.

4. The ranging sensor according to claim 1, wherein
the photoelectric conversion element receives reflected light of light emitted by a light emitter that performs pulse light emission, and
the transfer gate drive unit performs ON/OFF control of the first transfer gate and the second transfer gate by a pulse signal that drives the light emitter.

5. The ranging sensor according to claim 1, wherein
the transfer gate drive unit controls each of the first to sixth transfer gates such that the charge is accumulated in the second storage node via the second transfer gate while the charge is accumulated in the first storage node via the first transfer gate, and controls each of the first to sixth transfer gates such that the charge is accumulated in the first storage node via the second transfer gate while the charge is accumulated in the second storage node via the first transfer gate.

6. The ranging sensor according to claim 5, wherein
the transfer gate drive unit controls the fifth transfer gate to be turned off while controlling the third transfer gate to be turned on, and controls the sixth transfer gate to be turned off while controlling the fourth transfer gate to be turned on.

7. The ranging sensor according to claim 6, wherein
the transfer gate drive unit controls the third transfer gate and the fourth transfer gate to be turned on during a first period and controls the fifth transfer gate and the sixth transfer gate to be turned on during a second period different from the first period, and
a length of the first period is equal to a length of the second period.

8. The ranging sensor according to claim 6, wherein
a length of a period during which the charge is accumulated via the first transfer gate and a length of a period during which the charge is accumulated via the second transfer gate in the first storage node are both equal to a length of a period during which the charge is accumulated via the first transfer gate and a length of a period during which the charge is accumulated via the second transfer gate in the second storage node.

9. The ranging sensor according to claim 1, wherein
the transfer gate drive unit drives each of the third transfer gate, the fourth transfer gate, the fifth transfer gate, and the sixth transfer gate by three levels.

10. The ranging sensor according to claim 9, wherein
the driving by three levels includes driving with negative bias.

11. The ranging sensor according to claim 10, wherein
the transfer gate drive unit drives, with negative bias, the third transfer gate, the fourth transfer gate, the fifth transfer gate, and the sixth transfer gate during a read period of the charge accumulated in the first storage node and the second storage node.

12. The ranging sensor according to claim 1, further comprising
a plurality of the pixels.

13. The ranging sensor according to claim 1, further comprising
a pixel array unit in which the pixels are two-dimensionally arrayed.

14. A ranging module comprising:
a light emitter that performs pulse light emission; and
a ranging sensor including a pixel including a photoelectric conversion element that receives reflected light of light emitted from the light emitter, the ranging sensor including a transfer gate drive unit that drives a plurality of transfer gates, wherein
the pixel includes
the photoelectric conversion element,
a first storage node and a second storage node that store charge transferred from the photoelectric conversion element,
a first transfer gate and a second transfer gate connected to the photoelectric conversion element so as to branch and transfer the charge generated in the photoelectric conversion element to different paths,
a third transfer gate connected between the first storage node and the first transfer gate,
a fourth transfer gate connected between the second storage node and the second transfer gate,
a fifth transfer gate connected between the first storage node and the second transfer gate, and
a sixth transfer gate connected between the second storage node and the first transfer gate.

* * * * *